(12) United States Patent
Bapat

(10) Patent No.: US 9,094,360 B1
(45) Date of Patent: Jul. 28, 2015

(54) ACCESS RIGHT AUTHORIZATION

(71) Applicant: Google Inc., Mountain View, CA (US)

(72) Inventor: Shashank Ashok Bapat, Fremont, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/858,824

(22) Filed: Apr. 8, 2013

(51) Int. Cl.
*G06F 15/16* (2006.01)
*H04L 12/58* (2006.01)
*G06Q 50/00* (2012.01)

(52) U.S. Cl.
CPC .............. *H04L 51/32* (2013.01); *G06Q 50/01* (2013.01); *H04L 12/588* (2013.01)

(58) Field of Classification Search
CPC ....... G06Q 50/01; H04L 51/32; H04L 12/588
USPC ................... 709/200–205, 217–227
See application file for complete search history.

(56) References Cited

U.S. PATENT DOCUMENTS

| | | | |
|---|---|---|---|
| 8,166,016 B2* | 4/2012 | Higgins et al. ............... 707/706 |
| 2011/0055725 A1* | 3/2011 | Folgner et al. ............... 715/753 |
| 2012/0278262 A1* | 11/2012 | Morgenstern et al. .......... 706/12 |
| 2013/0046778 A1* | 2/2013 | Higgins et al. ............... 707/767 |
| 2013/0185811 A1* | 7/2013 | Suchter et al. ................ 726/29 |
| 2013/0311323 A1* | 11/2013 | Stoll et al. .................... 705/26.7 |
| 2013/0318180 A1* | 11/2013 | Amin et al. .................. 709/206 |

* cited by examiner

*Primary Examiner* — Moustafa M Meky
(74) *Attorney, Agent, or Firm* — Patent Law Works LLP

(57) ABSTRACT

The disclosure includes a system and method for suggesting authorization of access right between users. The system includes a processor and a memory storing instructions configured to: determine a first user based at least in part on activity data, the first user having a potential for authorizing other users to act on behalf of the first user; determine one or more second users as authorization candidates for the first user based on the one or more user interactions; generate suggestion data recommending the first user to authorize the one or more second users an access right to act on the behalf of the first user; provide the suggestion data to the first user; responsive to the first user authorizing the one or more second users, update an account setting for the first user describing the authorization of the access right to the one or more second users.

20 Claims, 12 Drawing Sheets

ACCESS RIGHT AUTHORIZATION

BACKGROUND

The specification relates to authorizing access right between users in social network systems or messaging systems.

Over the last decades, internet has become increasingly popular. Users communicate with each other using systems relying on internet technologies. Sometimes, users may desire to authorize other users access rights to act in the online systems on behalf of them. For example, a first user and second user share a computer or phone device. The first user may want the second user to comment on a post with an online social network service on behalf of the first user. Some existing systems may not provide functionality regarding this requirement and the second user has to write in the content of the comment that this comment is actually from the first user. However, this may be confusing to readers and this may cause inaccuracy when counting users' activities. Other existing systems may allow the first user and second user to link their accounts to accomplish the authorization, which, however, requires a higher level of trust and control between each other not limited to commenting on posts and requires a period of time for the systems to prepare the linking between the two accounts.

SUMMARY

According to one innovative aspect of the subject matter described in this disclosure, a system for suggesting authorization of access right between users includes: a processor and a memory storing instructions that, when executed, cause the system to: determine a first user based at least in part on one or more user interactions associated with the first user, the first user having a potential for authorizing other users to act on behalf of the first user; determine one or more second users as authorization candidates for the first user based on the one or more user interactions associated with the first user; generate suggestion data recommending the first user to authorize the one or more second users an access right to act on the behalf of the first user; provide the suggestion data to the first user; and responsive to the first user authorizing the one or more second users the access right to act on the behalf of the first user, update an account setting for the first user describing the authorization of the access right to the one or more second users.

In general, another innovative aspect of the subject matter described in this disclosure may be embodied in methods that include: determining a first user based at least in part on one or more user interactions associated with the first user, the first user having a potential for authorizing other users to act on behalf of the first user; determining one or more second users as authorization candidates for the first user based on the one or more user interactions associated with the first user; generating suggestion data recommending the first user to authorize the one or more second users an access right to act on the behalf of the first user; providing the suggestion data to the first user; and responsive to the first user authorizing the one or more second users the access right to act on the behalf of the first user, updating an account setting for the first user describing the authorization of the access right to the one or more second users.

Other aspects include corresponding methods, systems, apparatus, and computer program products for these and other innovative aspects.

These and other implementations may each optionally include one or more of the following features. For instances, the operations further include: receiving a request for a third user commenting on a post on behalf of the first user, determining whether the post has been shared with the first user, responsive to the determination that the post has been shared with the first user, determining whether the first user has an access right to comment on the post, responsive to the determination that the first user has the access right to comment on the post, determining whether the third user has an access right to comment on behalf of the first user based at least in part on the account setting for the first user, and responsive to the determination that the third user has the access right to comment on behalf of the first user, sending an authorization signal; receiving a submission signal indicating that the third user has submitted a comment responding to the post, generating a first notification for the first user including the comment, and sending the first notification to the first user; receiving an edit on the comment from the third user, updating a version index for the edited comment, generating a second notification for the first user including the edited comment, and sending the second notification to the first user; receiving an indication from the first user that the first user has approved the comment and determining graphical data for displaying the comment responding to the post.

For instance, the features include: the first user and the one or more second users sharing one or more electronic devices including a computer and a phone; and the suggestion data recommending the first user to authorize the one or more second users the access right to comment on a post on the behalf of the first user.

The present disclosure may be particularly advantageous in a number of respects. First, the system may allow users who share computer devices to authorize each other certain access rights regarding their social accounts and their social activities with a social network service. Second, the system may allow users to only authorize social abilities (e.g., ability to comment on posts, ability to publish new posts, etc.) to other users without letting them know private account information. Third, the system may also provide useful information about links between users or accounts. For example, the advertisement agents can take advantage of the useful information when promoting products to the users or accounts.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
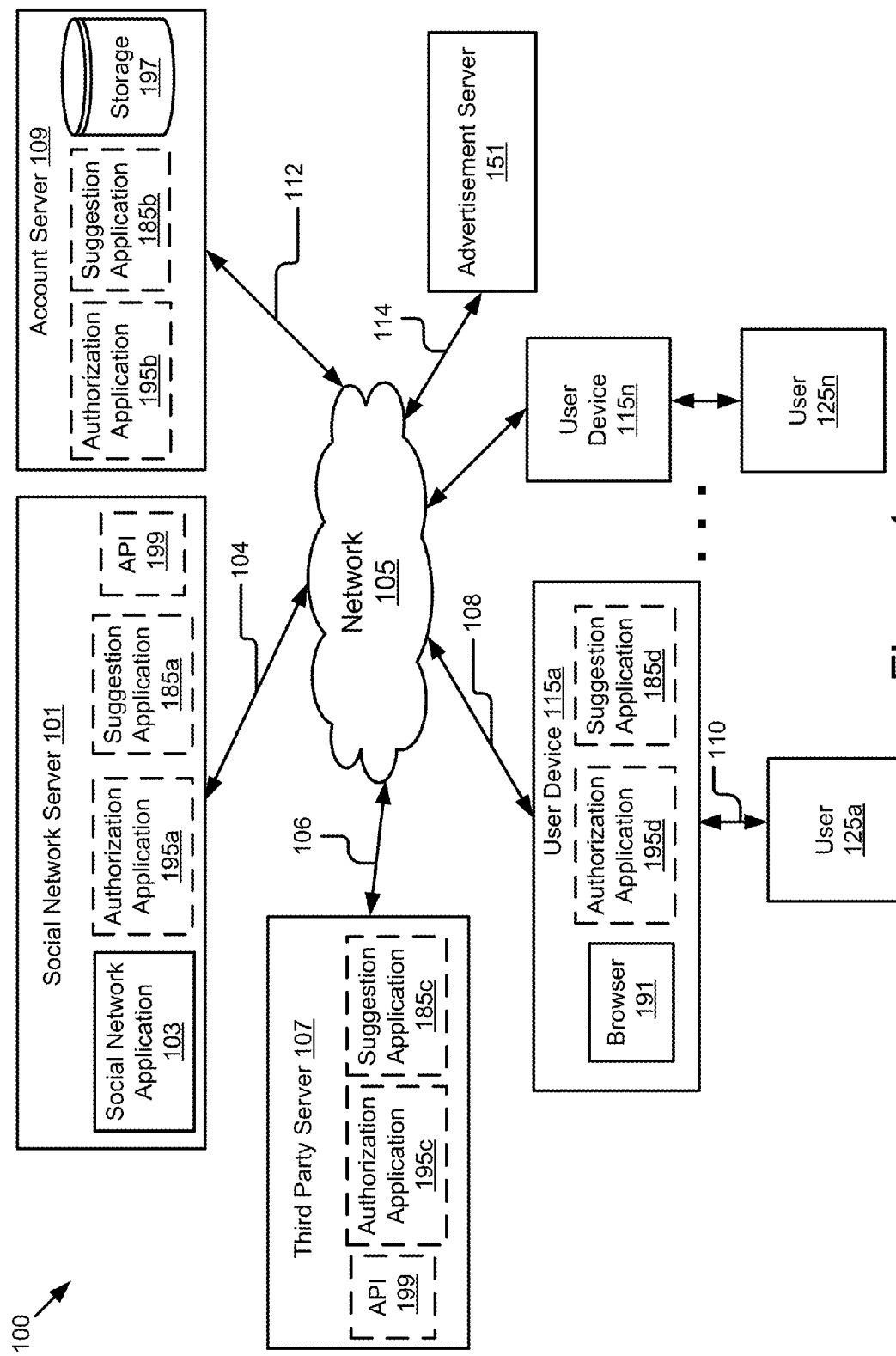
FIG. 1 is a block diagram illustrating an example system for authorizing access rights between users.

FIG. 1 illustrates a block diagram of some implementations of a system 100 for providing third party modifications to a user history. The illustrated system 100 includes user devices 115a . . . 115n (also referred to herein individually and collectively as 115) that can be accessed by users 125a . . . 125n (also referred to herein individually and collectively as 125), a social network server 101, a third party server 107, an account server 109 and an advertisement server 151. In the illustrated implementation, these entities of the system 100 are communicatively coupled via a network 105.

The user devices 115a, 115n in FIG. 1 can be used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the third party server 107, the account server 109 and the advertisement server 151, in practice one or more networks 105 can be connected to these entities. Furthermore, while FIG. 1 includes one social network server 101, one third party server 107, one account server 109 and one advertisement server 151, the architecture 100 could include one or more social network servers 101, one or more third party servers 107, one or more account servers 109 and one or more advertisement servers 151.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

The social network server 101 can be a hardware server that includes a processor, a memory and network communication capabilities. In the illustrated implementation, the social network server 101 is coupled to the network 105 via signal line 104. The social network server 101 sends and receives data to and from one or more of the user devices 115a, 115n, the third party server 107, the account server 109 and the advertisement server 151 via the network 105. The social network server 101 includes a social network application 103. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, it should be understood that the social network server 101 and the social network application 103 can be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus. In some implementations, the social network includes a service that provides a social feed describing one or more activities of a user 125. For example, the social feed includes one or more status updates for the user 125 describing the user's actions, thoughts, opinions, etc. In some implementations the social network application 103 can be stored and executed on one of the third party server 107 and the account server 109. In some implementations, the service provided by the social network application 103 is referred to as a "social network service." Other implementations can be possible. In some implementations, the services and components of the third party server 107, social network server 101, and account server 109 can be provided by the same one or more servers. Moreover, the separation of various components and servers in the implementations described herein should not be understood as requiring such separation in all implementations, and it should be understood that the described components and servers can generally be integrated together in a single component or server.

In some implementations, the social network server 101 includes an optional application programming interface ("API") 199a. The API 199a can include code and routines for handling data communication among different entities. For example, the optional API 199a can be stored in the social network server 101 and includes code and routines for handling data communication between the social network server 101 and the account server 109. In the illustrated implementation, the API 199a is depicted using a dashed line to indicate that the API 199a may be an optional feature for the social network server 101.

In some implementations, the social network server 101 also includes a suggestion application 185a (also referred to herein individually and collectively as 185). In some implementations, the suggestion application 185 can be stored on the account server 109. For example, the suggestion application 185b can be stored on the account server 109, which is connected to the network 105 via signal line 112. In some implementations, the suggestion application 185c can be included in the third party server 107. For example, the suggestion application 185c can be stored in the third party server 107. In some implementations, the suggestion application 185d can be stored on a user device 115. For example, the suggestion application 185d can be stored in the user device 115a, which is connected to the network 105 via signal line 108. It should be understood that the suggestion application 185 can be stored in one of the devices and servers or in a combination of the devices and servers.

The suggestion application 185 can be code and routines for suggesting an authorization of an access right between users 125. In some implementations, the suggestion application 185 can be implemented using hardware including a field-programmable gate array ("FPGA") or an application-specific integrated circuit ("ASIC"). In some other instances, the suggestion application 185 can be implemented using a combination of hardware and software. In some implementations, the suggestion application 185 may be stored in a combination of the devices and servers, or in one of the devices or servers.

In some implementations, the suggestion application 185 determines a first user 125 based at least in part on activity data associated with the first user 125 including session data and interaction data describing one or more user interactions associated with the first user 125. The first user 125 has a potential for authorizing other users 125 to act on behalf of the first user 125. For example, the first user 125 shares an electronic device (e.g., a computer, a phone, etc.) with a second user 125 and may have a desire to authorize the second user 125 to act on behalf of the first user 125. In some instances, the first user 125 may be an executive officer or a celebrity who may be busy and need an assistant to act on behalf of the first user 125. In some instances, the first user 125 enjoys online role playing games with other second users 125 in a closed online community, e.g., an online community of high school students. In some implementations, the session data may include browser cookies.

In some implementations, the suggestion application 185 determines one or more second users 125 as authorization candidates for the first user 125 based on the activity data associated with the first user 125. In some instances, an authorization candidate can be a proxy for a first user 125 who is determined to have a potential for authorizing the proxy to act on behalf of the first user 125. For example, the suggestion application 185 determines one or more second users 125 who share computer with the first user 125 as one or more proxies for the first user 125. In some instances, the one or more second users 125 may be assistants for the first user 125 who is a celebrity or a chef executive officer. In some instances, the one or more second users 125 may play role playing games with the first user 125 in a closed online community. In some implementations, the suggestion application 185 determines a set of one or more proxies from the social graph provided by the social network server 101. For example, the one or more proxies have registered social accounts with the social network server 101. The suggestion application 185 determines a set of one or more proxies based on the social accounts so that the first user 125 can choose from and authorize. In some instances, the set of one or more proxies for the first user 125 can be a proxy circle for the first user 125 including one or more social network users 125 who have social accounts with the social network server 101. In some instances, the set of one or more proxies for the first user 125 can be a circle of social network users 125 who are connected to the first user 125 by the social graph. For example, the suggestion application 185 determines a proxy circle including social connections for the first user 125 (e.g., friends, family, followers, etc.) so that the first user 125 can choose to authorize.

The suggestion application 185 generates suggestion data and provides the suggestion data to the first user 125 for recommending the first user 125 to authorize the one or more second users 125 an access right to act on the behalf of the first user 125. For example, the suggestion application 185 determines graphical data for displaying a user interface that provides the suggestion data to the first user 125. Responsive to the first user 125 authorizing the one or more second users 125 the access right to act on the behalf of the first user 125, the suggestion application 185 updates an account setting for the first user 125 describing the authorization of the access right to the one or more second users 125. For example, the first user 125 may accept the suggestion displayed in the user interface by clicking an "authorize" button via the user device 115. Upon the first user's acceptance, the suggestion application 185 can configure the account setting for the first user 125 allowing the one or more second users 125 to act on behalf of the first user 125. In some instances, the suggestion data can describe a proxy circle including one or more second users (e.g., proxies) for the first user 125. The first user 125 can be provided a user interface to authorize the proxy circle to act on behalf of the first user 125. The suggestion application 185 can configure the account setting for the first user 125 authorizing the one or more second users 125 in the proxy circle upon consent of the first user 125. Therefore, the one or more second users 125 in the proxy circle can act on behalf of the first user 125 upon an approval of the first user 125 on the social actions of the one or more second users 125. In some implementations, the first user 125 can be provided a user interface to modify the proxy circle authorized by the first user 125. For example, the first user 125 can dynamically add, via the user interface, a new second user 125 into the proxy circle so that the new second user 125 is able to act on behalf of the first user 125. In some instances, the first user 125 can dynamically remove a second user 125 from the proxy circle to take back the authorization to the second user 125 without any effect on other second users in the proxy circle. In some instances, the first user 125 specifies the account setting via the user interface and the suggestion application 185 updates the account setting based at least in part on first user's specification. The suggestion application 185 will be described in further detail below with reference to FIGS. 2, 4 and 5A-5B.

One significant benefit for authorizing one or more proxies as described herein can be allowing a first user 125 to authorize a second user 125 to act on behalf of the first user 125 without disclosing credential information of the first user 125 to the second user 125. For example, the second user 125 logs in a social account with the social network using credential information of the second user 125 and interacts with social services on behalf of the first user 125 without knowing credential information of the first user 125 (e.g., a user name of the first user 125, a user identifier for the first user 125, a login password for the first user 125, etc.). By allowing the second user 125 to act on behalf of the first user 125 using the second user's 125 own account, the first user 125 can highly control social actions on behalf of the first user 125 acted by the second user 125 via reviewing and approving or rejecting the social actions. The review and approval/rejection process will be implemented by the authorization application 195 which will be described below with further detail.

In some implementations, the social network server 101 also includes an authorization application 195a (also referred to herein individually and collectively as 195). In some implementations, the authorization application 195 can be stored on the account server 109. For example, the authorization application 195b can be stored on the account server 109, which is connected to the network 105 via signal line 112. In some implementations, the authorization application 195 can be included in the third party server 107. For example, the authorization application 195c can be stored in the third party server 107. In some implementations, the authorization application 195 can be stored on a user device 115. For example, the authorization application 195d can be stored in the user device 115a. It should be understood that the authorization application 195 can be stored in one of the devices and servers or in a combination of the devices and servers.

The authorization application 195 can be code and routines for authorizing a second user 125 to act on behalf of a first user 125 upon consent of the first user 125. In some implementations, the authorization application 195 can be implemented using hardware including a field-programmable gate array ("FPGA") or an application-specific integrated circuit ("ASIC"). In some other instances, the authorization application 195 can be implemented using a combination of hardware and software. In some implementations, the authorization application 195 may be stored in a combination of the devices and servers, or in one of the devices or servers.

In some implementations, the authorization application 195 receives a request for a second user 125 commenting on a post on behalf of the first user 125. For example, a second user 125 logs in a social network service provided by a social network application 103 via a user device 115 and types in an edit box for commenting on a post on behalf of the first user 125, causing the authorization application 195 to receive, via a network 105, the request for the second user 125 commenting on a post on behalf of the first user 125 from the user device 115. The authorization application 195 determines whether the post has been shared with the first user 125. For example, the post has been submitted by a third user 125 who shares the post with a group of friends. The authorization application 195 determines whether the first user 125 may be one of the friends. Responsive to the determination that the post has been shared with the first user 125, the authorization application 195 determines whether the first user 125 has an access right to comment on the post. For example, the third user 125 allows one or more friends in the group of friends to comment on the post. The authorization application 195 determines whether the first user 125 may be among the one or more friends who may be allowed to comment on the post. Responsive to the determination that the first user 125 has the access right to comment on the post, the authorization application 195 determines whether the second user 125 has an access right to comment on behalf of the first user 125 based at least in part on the account setting for the first user 125. For example, the authorization application 195 retrieves the account setting for the first user 125 including an authorization setting, parses the authorization setting and determines whether the first user 125 allows the second user 125 to comment on posts on behalf of the first user 125. Responsive to the determination that the second user 125 has the access right to comment on behalf of the first user 125, the authorization application 195 generates and sends an authorization signal to one or more of the social network application 103, the third party server 107 and the user device 115. The authorization application 195 will be described in further detail below with reference to FIGS. 3 and 6A-6C.

The third party server 107 can be a hardware server that includes a processor, a memory and network communication capabilities. In the illustrated implementation, the third party server 107 is coupled to the network 105 via signal line 106. The third party server 107 sends and receives data to and from other entities of the system 100 via the network 105. The third party server 107 includes an authorization application 195c, a suggestion application 185c and an optional API 199. The components of the third party server 107 are communicatively coupled to each other.

The API 199b provides similar functionality as the API 199a as described above and the descriptions will not be repeated here. In some implementations, the optional API 199b can be stored in the third party server 107 and includes code and routines for handling data communication between the third party server 107 and the social network server 101. For example, the API 199b can include an interface allowing the third party server 107 to transmit data to the social network server 101.

In some implementations, the third party server 107 may also include a service module (not pictured). The service module can be code and routines for providing a service to a user 125. For example, the service module includes code and routines for providing a web page with an embedded video to a user 125 and allowing the user 125 to interact with the web page and/or the video. Other examples of services provided by the service module include, but not limited to, providing a news feed, publishing an article, generating a playlist, publishing a video, posting a picture or other online services. In some implementations, a user 125 interacts with a service provided by the service module. The service module generates user activity data describing the user interaction with the service. For example, a user 125 comments on a news article presented on a web page provided by the service module, causing the service module to generate user activity data describing that the user 125 has commented on the news article. The service module sends the user activity data to the suggestion application 185 for identifying a first user 125 who has a potential for authorizing other users 125 access rights. In some implementations, the service module stores the user activity data in the storage 197. In some implementations, the service module can be stored and executed on one of the social network server 101 and the account server 109. The service provided by the service module can be referred to as a "first service."

The account server 109 can be a hardware server that includes a processor, a memory and network communication capabilities. In the illustrated implementation, the account server 109 is coupled to the network 105 via signal line 112. The account server 109 sends and receives data to and from other entities of the system 100 via the network 105. In some implementations, the account server 109 includes a suggestion application 185b, an authorization application 195b and a storage device 197. The components of the account server 109 are communicatively coupled to each other.

The storage device 197 can be a non-transitory memory that stores data for providing the functionality described herein. The storage 197 may be a dynamic random access memory (DRAM) device, a static random access memory (SRAM) device, flash memory or some other memory devices. In some implementations, the storage 197 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage 197 stores account data associated with one or more users 125. For example, the account data describes one or more account settings. In some instances, an account setting for a first user 125 can include an authorization setting enabling one or more second users 125 to act on behalf of the first user 125. For example, the authorization setting indicates that the first user 125 allows a list of second users 125 to comment on existing posts on behalf of the first user 125. In some instances, the authorization setting indicates that the first user 125 does not allow other users 125 to publish a new post or message on behalf of the first user 125. In some implementations, the suggestion application 185 may provide options for configuring account settings to users 125.

The user device 115a, 115n may be a computing device that includes a memory and a processor, for example a laptop computer, a desktop computer, a tablet computer, a mobile telephone, a personal digital assistant ("PDA"), a mobile email device, a portable game player, a portable music player, a television with one or more processors embedded therein or coupled thereto or other electronic device capable of accessing a network 105. In some implementations, the user device 115 includes a browser 191 for accessing online services. In the illustrated implementation, the user device 115a is communicatively coupled to the network 105 via signal line 108. The user 125a interacts with the user device 115a via signal line 110. The user device 115n is communicatively coupled to the network 105. The user 125n also interacts with the user device 115n. In some implementations, the suggestion application 185 and the authorization application 195 act in part as a thin-client application that may be stored on the user device 115a, 115n and in part as components that may be stored on one or more of the social network server 101, the third-party server 107 and the account server 109.

In some implementations, a user 125 logs in one or more of the social network server 101, the third party server 107 and the account server 109 using a universal login account. In some instances, a user 125 logs in each of the social network server 101, the third party server 107 and the account server 109 using an individual login account.

The advertisement server 151 can be a hardware server that includes a processor, a memory and network communication capabilities. In the illustrated implementation, the advertisement server 151 is coupled to the network 105 via signal line 114. The advertisement server 151 sends and receives data to and from other entities of the system 100 via the network 105. In some implementations, the advertisement server 151 receives account data describing access rights authorization between users or accounts from one or more of the account server 109, the social network server 101 and the third party server 107. The advertisement server 151 processes the account data to determine links between users or accounts so that the advertisement server 151 can provide advertisements targeting the users or accounts.

Figure 2:
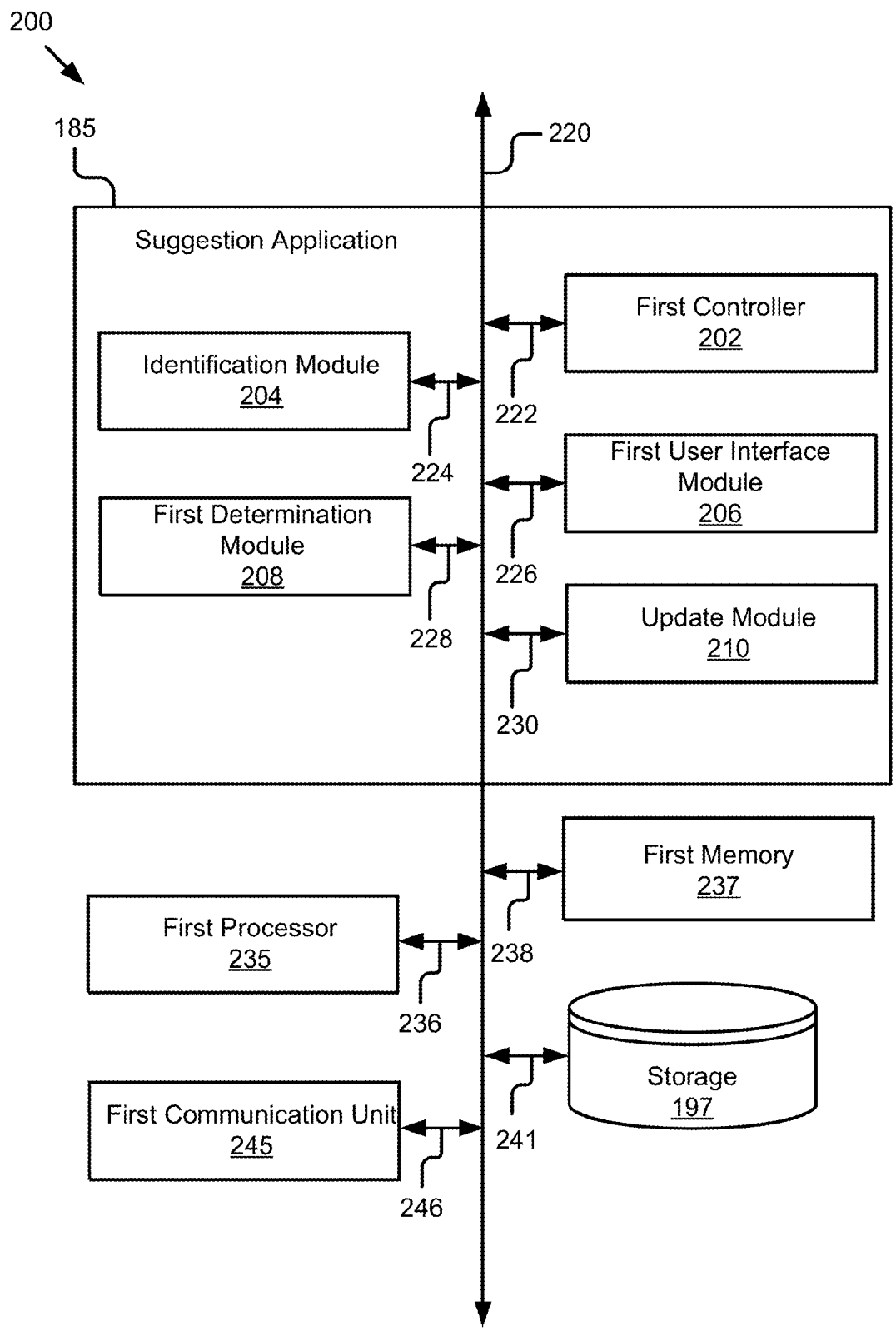
FIG. 2 is a block diagram illustrating an example of an authorization application.

Referring now to FIG. 2, an example of the suggestion application 185 is shown in more detail. FIG. 2 is a block diagram of a computing device 200 that includes a suggestion application 185, a first processor 235, a first memory 237, a first communication unit 245 and a storage device 197 according to some examples. The components of the computing device 200 are communicatively coupled by a bus 220. In some implementations, the computing device 200 can be one of a social network server 101, a user device 115, a third party server 107 and an account server 109.

The first processor 235 includes an arithmetic logic unit, a microprocessor, a general purpose controller or some other processor array to perform computations and provide electronic display signals to a display device. The first processor 235 is coupled to the bus 220 for communication with the other components via signal line 236. The first processor 235 processes data signals and may include various computing architectures including a complex instruction set computer (CISC) architecture, a reduced instruction set computer (RISC) architecture, or an architecture implementing a combination of instruction sets. Although FIG. 2 includes a single first processor 235, multiple processors may be included. Other processors, operating systems, sensors, displays and physical configurations may be possible.

The first memory 237 stores instructions and/or data that may be executed by the first processor 235. The first memory 237 is coupled to the bus 220 for communication with the other components via signal line 238. The instructions and/or data may include code for performing the techniques described herein. The first memory 237 may be a dynamic random access memory (DRAM) device, a static random access memory (SRAM) device, flash memory or some other memory device. In some implementations, the first memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The first communication unit 245 transmits and receives data to and from at least one of the user device 115, the third-party server 107, the account server 109 and the social network server 101 depending upon where the suggestion application 185 may be stored. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5 or similar port for wired communication with the user device 115. In some implementations, the communication unit 245 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 245 includes a wired port and a wireless transceiver. The communication unit 245 also provides other conventional connections to the network 105 for distribution of files and/or media objects using standard network protocols including TCP/IP, HTTP, HTTPS and SMTP, etc.

The storage 197 is described above with reference to FIG. 1, and the description will not be repeated here. In the illustrated implementation, the storage 197 is communicatively coupled to the bus 220 via signal line 241.

In the illustrated implementation shown in FIG. 2, the suggestion application 185 includes a first controller 202, an identification module 204, a first user interface module 206, a first determination module 208 and an update module 210. These components of the suggestion application 185 are communicatively coupled to each other via the bus 220.

The first controller 202 can be software including routines for handling communications between the suggestion application 185 and other components of the computing device 200. In some implementations, the first controller 202 can be a set of instructions executable by the first processor 235 to provide the functionality described below for handling communications between the suggestion application 185 and other components of the computing device 200. In some instances, the first controller 202 can be stored in the first memory 237 of the computing device 200 and can be accessible and executable by the first processor 235. The first controller 202 may be adapted for cooperation and communication with the first processor 235 and other components of the computing device 200 via signal line 222.

The first controller 202 sends and receives data, via the communication unit 245, to and from one or more of a user device 115, a social network server 101, a third party server 107 and an account server 109. In some instances, the first controller 202 receives, via the communication unit 245, activity data associated with a user 125 from one or more of the user device 115, the social network server 101 and the third party server 107. In some instances, the first controller 202 receives graphical data for providing a user interface that displays suggestions to a user 125 from the first user interface module 206 and sends, via the communication unit 245, the graphical data to a user device 115, causing the user device 115 to present the user interface displaying the suggestions to the user 125. In some instances, the first controller 202 receives, via the communication unit 245, a user indication responding to the suggestions from the user device 115 and delivers the user indication to one or more appropriate components of the suggestion application 185, e.g., the first determination module 208.

In some implementations, the first controller 202 receives data from components of the suggestion application 185 and stores the data in the storage 197. For example, the first controller 202 receives suggestion data describing one or more suggestions for a user 125 from the identification module 204 and stores the suggestion data in the storage 197. In some implementations, the first controller 202 retrieves data from the storage 197 and sends the data to components of the suggestion application 185. For example, the first controller 202 retrieves account data describing account settings for a user 125 from the storage 197 and sends the account data to the update module 210 for updating the account settings for the user 125.

The identification module 204 can be software including routines for identifying a potential authorizer 125 and one or more candidate users 125 to be recommended to the potential authorizer 125. In some implementations, the identification module 204 can be a set of instructions executable by the first processor 235 to provide the functionality described below for identifying a potential authorizer 125 and one or more candidate users 125 to be recommended to the potential authorizer 125. In some instances, the identification module 204 can be stored in the first memory 237 of the computing device 200 and can be accessible and executable by the first processor 235. The identification module 204 may be adapted for cooperation and communication with the first processor 235 and other components of the computing device 200 via signal line 224.

In some implementations, the identification module 204 cooperates with the first controller 202 to retrieves activity data associated with users 125 from one or more of the user device 115, the social network server 101 and the third party server 107. In some instances, the activity data associated with users 125 includes session data and interaction data describing one or more user interactions associated with the users 125. For example, the session data includes one or more browser cookies describing a user 125 browsing a website. A user interaction describes a user action regarding a service provided by one or more of the social network server 101 and the third party server 107. For example, a user interaction describes that a first user 125 comments on a post submitted by a second user 125. In some implementations, other activity data associated with users 125 may be possible. In some implementations, the identification module 204 parses the activity data and determines a first user 125 as a potential authorizer 125 based at least in part on the activity data. In some instances, a potential authorizer 125 may have a potential for authorizing other users 125 to act on behalf of the potential authorizer 125. For example, the identification module 204 determines, by parsing one or more browser cookies, that a first user 125 shares an electronic device (e.g., a computer, a phone, etc.) with a second user 125 and may have a desire to authorize the second user 125 to act (e.g., comment on posts, publish new posts, etc.) on behalf of the first user 125. In some instances, a potential authorizer 125 may be an executive or a celebrity who may be busy and need an assistant to act on behalf of the potential authorizer 125. In some instances, a potential authorizer 125 enjoys online role playing games with other users 125 in a closed online community, e.g., an online community of high school students.

In some implementations, identification module 204 further determines one or more second users 125 as authorization candidates to be recommended to the first user 125. As described above, an authorization candidate can be a proxy for the first user 125. In some instances, the one or more second users 125 share a computer with the first user 125. In some instances, the one or more second users 125 may be assistants for the first user 125. In some instances, the one or more second users 125 may play role playing games with the first user 125 in a closed online community. In some implementations, the identification module 204 generates suggestion data recommending the first user 125 to authorize an access right to the one or more second users 125 to act on behalf of the first user 125. For example, the suggestion data describes a second user 125 to be recommended to the first user 125 as a proxy for commenting on existing posts on behalf of the first user 125. In some implementations, the identification module 204 determines a set of one or more proxies from the social graph provided by the social network server 101. For example, the one or more proxies have registered social accounts with the social network server 101. In some instance, the one or more proxies can be social connections to the first user 125 specified by the social graph provided by the social network server 101. In some implementations, the identification module 204 can form a proxy circle based on the set of one or more proxies for the first user 125. The first user 125 can authorize the proxy circle to act on behalf of the first user 125 via a user interface so that the one or more proxies in the proxy circle can act on behalf of the first user 125.

In some implementations, the identification module 204 sends the suggestion data to the first user interface module 206 for generating graphical data to display a user interface providing the suggestion data to the first user 125. In some implementations, the identification module 204 stores the suggestion data in the storage 197.

The first user interface module 206 can be software including routines for generating graphical data for providing user interfaces. In some implementations, the first user interface module 206 can be a set of instructions executable by the first processor 235 to provide the functionality described below for generating graphical data for providing user interfaces described below with reference to FIG. 7. In some instances, the first user interface module 206 can be stored in the first memory 237 of the computing device 200 and can be accessible and executable by the first processor 235. The first user interface module 206 may be adapted for cooperation and communication with the first processor 235 and other components of the computing device 200 via signal line 226.

In some implementations, the first user interface module 206 generates graphical data for providing a user interface that depicts one or more suggestions for a potential authorizer 125. The first user interface module 206 sends the graphical data to a user device 115 operated by the potential authorizer 125, causing the user device 115 to present the one or more suggestions to the potential authorizer 125 via the user interface. For example, the user interface displays a suggestion for recommending the potential authorizer 125 to configure the account settings to allow a second user 125 to act on behalf of the potential authorizer 125. In some instances, the potential authorizer 125 may accept the suggestion to authorize the second user 125 the access right to act on behalf of the potential authorizer 125 via the user interface. For example, the potential authorizer 125 may click on an "authorize" button on the user interface via the user device 115. In some instances, the potential authorizer 125 may dismiss the suggestion via the user interface. In some instances, the potential authorizer 125 may opt in or opt out from receiving such suggestions.

In some implementations, the first user interface module 206 generates graphical data for providing a user interface that allows a user 125 to configure the account settings. For example, the user interface allows a user 125 to select different levels of authorization. In some instances, the user interface allows a first user 125 to select from: denying other users 125 to comment on or respond to existing posts on behalf of the first user 125; authorizing other users 125 the ability to comment on or respond to existing posts on behalf of the first user 125; and/or authorizing an access control list of certain second users 125 to comment on or respond to existing posts on behalf of the first user 125. In some instances, the user interface allows a first user 125 to select from: denying other users 125 to publish a new post or message on behalf of the first user 125; authorizing other users 125 the ability to publish a new post or message on behalf of the first user 125; and/or authorizing an access control list of certain second users 125 to publish a new post or message on behalf of the first user 125. Furthermore, the first user 125 can also specify the certain second users 125 via the user interface. For example, the first user 125 can selects certain second users 125 from the first user's 125 social connections specified by the social graph (e.g., friends, family, etc.). In some instance, the first user 125 can also specify whether to make the comments, new posts and messages submitted by the second users 125 on behalf of the first user 125 visible without the approval of the first user 125. For example, the first user 125 can specify that the comments, new posts and messages submitted by the second users 125 on behalf of the first user 125 may be visible even without the approval of the first user 125. For example, the first user 125 can specify that the comments, new posts and messages submitted by the second users 125 on behalf of the first user 125 cannot be visible to other users 125 without the approval of the first user 125.

The first determination module 208 can be software including routines for determining whether the potential authorizer 125 has agreed with the suggestions. In some implementations, the first determination module 208 can be a set of instructions executable by the first processor 235 to provide the functionality described below for determining whether the potential authorizer 125 has agreed with the suggestions. In some instances, the first determination module 208 can be stored in the first memory 237 of the computing device 200 and can be accessible and executable by the first processor 235. The first determination module 208 may be adapted for cooperation and communication with the first processor 235 and other components of the computing device 200 via signal line 228.

In some implementations, the first determination module 208 cooperates with the first controller 202 receives, via the communication unit 245, a user input responding to the suggestion displayed in the user interface on the user device 115. For example, the first user 125 clicks an "authorize" button indicating that the first user 125 accepts the suggestion of authorizing a second user 125 an access right to act on behalf of the first user 125, causing the first determination module 208 receives, via the communication unit 245 and the first controller 202, the user indication of authorizing the second user 125 to act on behalf of the first user 125. In some instances, the first user 125 may choose to reject the suggestion and the first determination module 208 receives an indication of rejection accordingly. The first determination module 208 determines whether the first user 125 has agreed with the suggestion based at least in part on the received user indication. If the first determination module 208 determines that the first user 125 has agreed with the suggestion of authorization, the first determination module 208 sends the determination to the update module 210. If the first determination module 208 determines that the first user 125 has not accepted the suggestion of authorization, the first determination module 208 sends a rejection signal to the update module 210.

In some instances, the first user 125 may select to opt out from receiving such suggestions, causing the first determination module 208 to receive, via the first controller 202 and the network 105, an opt-out input from the first user 125. The first determination module 208 generates an opt-out signal indicating not sending such suggestions to the first user 125 and the first determination module 208 sends the opt-out signal to the identification module 204. The identification module 204 may stop generating and sending such suggestions to the first user 125.

The update module 210 can be software including routines for updating account settings for users 125. In some implementations, the update module 210 can be a set of instructions executable by the first processor 235 to provide the functionality described below for updating account settings for users 125. In some instances, the update module 210 can be stored in the first memory 237 of the computing device 200 and can be accessible and executable by the first processor 235. The update module 210 may be adapted for cooperation and communication with the first processor 235 and other components of the computing device 200 via signal line 230.

In some implementations, the update module 210 receives a determination that a first user 125 has agreed to authorize one or more second users 125 an access right to act on behalf of the first user 125 from the first determination module 208. In some implementations, the update module 210 also receives, via the first controller 202, a user input describing one or more authorization settings specified by the first user 125. For example, as described above with reference to the first user interface module 206, the first user 125 may specify, via a user interface, a group of certain second users 125 that may be social connections to the first user 125 and indicates to allow the group of certain second users 125 to comment on behalf of the first user 125. The update module 210 receives the user input via the first controller 202. In some implementations, the update module 210 updates account settings for the first user 125 based at least in part on the user input describing that the first user 125 authorizes the group of certain second users 125 access rights to comment on posts on behalf of the first user 125. For example, the update module 210 configures the account settings to specify that the group of certain second users 125 has been authorized by the first user 125 to comment on posts on behalf of the first user 125.

In some implementations, the update module 210 receive a user input specifying that the first user 125 allows a group of certain second users 125 to publish a new post or message on behalf of the first user 125. The update module 210 configures the account settings for the first user 125 accordingly.

In some implementations, the update module 210 updates a proxy circle for a first user 125 based upon the first user's 125 specification. For example, if the first user 125 indicates to add a new proxy into the proxy circle via a user interface, the update module 210 updates the account settings of the first user 125 to allow the new proxy to act on behalf of the first user 125. In some instances, if the first user 125 indicates to remove an existing proxy in the proxy circle via a user interface, the update module 210 configures the account settings for the first user 125 to deny the existing proxy to act on behalf of the first user 125 anymore.

In some implementations, the update module 210 stores account data describing account settings for the first user 125 in the storage 197. In some implementations, the account data may be retrieved by the authorization application 195 to determine that a second user 125 has been authorized to act on behalf of a first user 125 and to allow the second user 125 to act as the first user 125.

Figure 3:
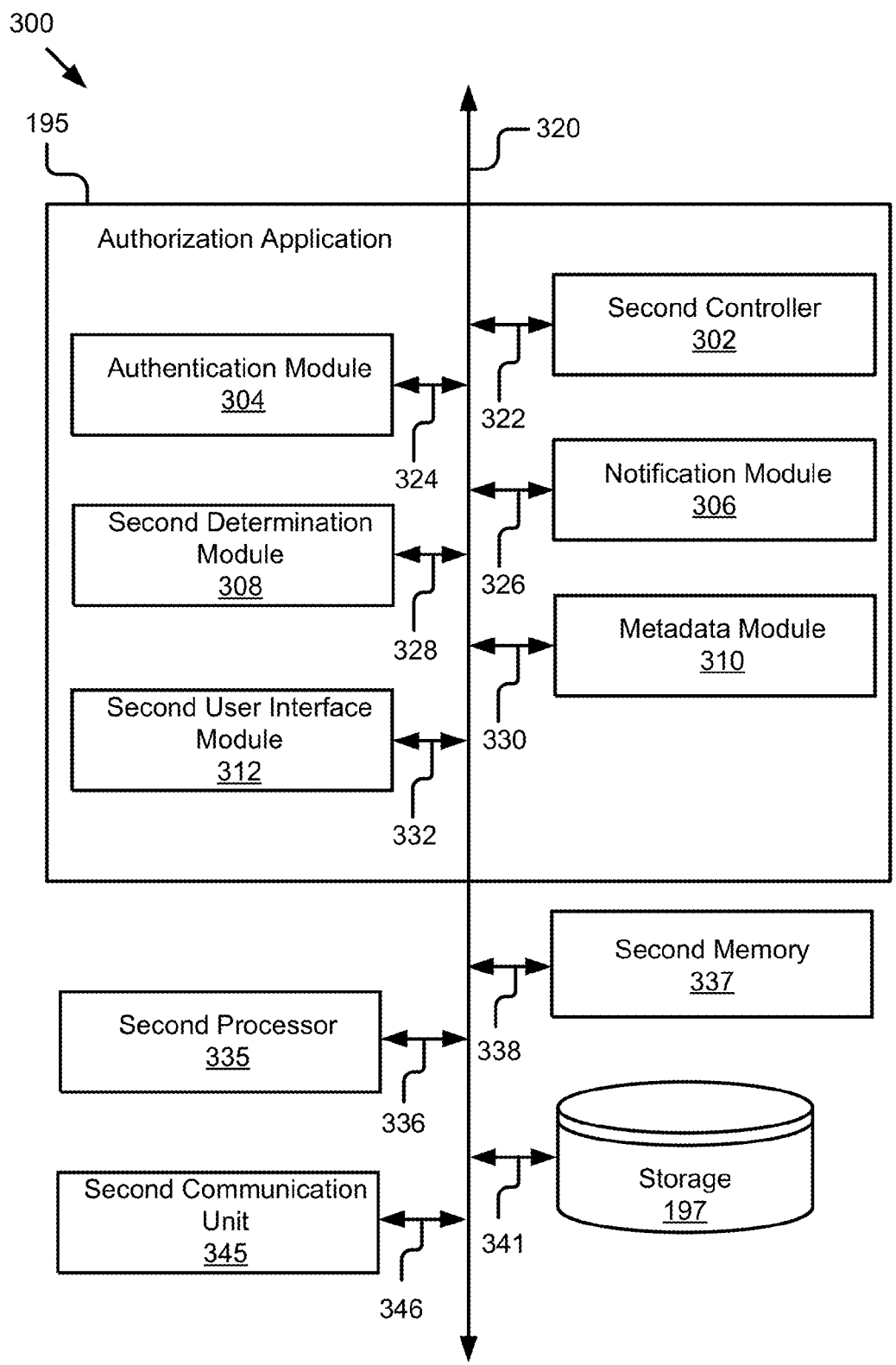
FIG. 3 is a block diagram illustrating an example of a suggestion application.

Referring now to FIG. 3, an example of the authorization application 195 is shown in more detail. FIG. 3 is a block diagram of a computing device 300 that includes a second communication unit 345, a second processor 335, a second memory 337 and a storage device 197 according to some examples. The components of the computing device 300 are communicatively coupled by a bus 320. In some implementations, the computing device 300 can be one of a social network server 101, a user device 115, a third party server 107 and an account server 109.

The second communication unit 345, second processor 335 and second memory 337 provide similar functionality as described above for the first communication unit 245, the first processor 235 and the first memory 237, respectively. Accordingly, these descriptions will not be repeated here. In the illustrated implementation, the second communication unit 345 is communicatively coupled to the bus 320 via signal line 346, the second processor 335 is communicatively coupled to the bus 320 via signal line 336 and the second memory 337 is communicatively coupled to the bus 320 via signal line 338. The storage 197 is described above with reference to FIG. 1, and the description will not be repeated here. In the illustrated implementation, the storage 197 is communicatively coupled to the bus 320 via signal line 341.

In the illustrated implementation shown in FIG. 3, the authorization application 195 includes a second controller 302, an authentication module 304, a notification module 306, a second determination module 308, a metadata module 310 and a second user interface module 312. These components of the authorization application 195 are communicatively coupled to each other via the bus 320.

The second controller 302 can be software including routines for handling communications between the authorization application 195 and other components of the computing device 300. In some implementations, the second controller 302 can be a set of instructions executable by the second processor 335 to provide the functionality described below for handling communications between the authorization application 195 and other components of the computing device 300. In some instances, the second controller 302 can be stored in the second memory 337 of the computing device 300 and can be accessible and executable by the second processor 335. The second controller 302 may be adapted for cooperation and communication with the second processor 335 and other components of the computing device 300 via signal line 322.

The second controller 302 sends and receives data, via the second communication unit 345, to and from one or more of a user device 115, a social network server 101, a third party server 107 and an account server 109. In some instances, the second controller 302 receives, via the second communication unit 345, an authorization request for a first user 125 commenting on a post as a second user 125 from one or more of the social network server 101, the user device 115 and the third party server 107. In some instances, the second controller 302 sends, via the second communication unit 345, an authorization signal to one or more of the social network server 101, the user device 115 and the third party server 107 for allowing the first user 125 to act on behalf of the second user 125. In some instances, the second controller 302 receives, via the second communication unit 345, a submission signal from one or more of the social network server 101, the user device 115 and the third party server 107 indicating that the first user 125 submitted the activity on behalf of the second user 125. For example, the submission signal indicates that the first user 125 submitted a comment on behalf of the second user 125. In some instances, the second controller 302 receives a notification from the notification module 306 and sends, via the second communication unit 345, the notification to one or more of the social network server 101, the user device 115 and the third party server 107 for notifying the second user 125 regarding the activity done by the first user 125 on behalf of the second user 125. In some instances, the second controller 302 receives, via the second communication unit 345, a user input describing an approval decision of the second user 125 for approving the activity from one or more of the social network server 101, the user device 115 and the third party server 107.

In some implementations, the second controller 302 receives data from other components of the authorization application 195 and stores the data in the storage 197. For example, the second controller 302 receives metadata associated with the activities from the metadata module 310 and stores the metadata in the storage 197. In some implementations, the second controller 302 retrieves data from the storage 197 and sends the data to other components of the authorization application 195. For example, the second controller 302 retrieves account data describing account settings for the second user 125 from the storage 197 and sends the account data to the authentication module 304 for determining whether the second user 125 allows the first user 125 to act on behalf of the second user 125.

The authentication module 304 can be software including routines for determining whether a first user 125 can act on behalf of a second user 125. In some implementations the authentication module 304 can be a set of instructions executable by the second processor 335 to provide the functionality described below for determining whether a first user 125 can act on behalf of a second user 125. In some instances, the authentication module 304 can be stored in the second memory 337 of the computing device 300 and can be accessible and executable by the second processor 335. The authentication module 304 may be adapted for cooperation and communication with the second processor 335 and other components of the computing device 300 via signal line 324.

In some implementations, the authentication module 304 receives, via the second controller 302, login information of a first user 125 from a user device 115 upon the first user 125 logging in a service. For example, the service may be a social network service provided by the social network application 103. The service may also be a service provided by the third party server 107. In some implementations, the authentication module 304 receives, via the second controller 302, an authorization request for the first user 125 acting on behalf of a second user 125. For example, upon the first user 125 selects an option in a user interface to comment on a post as a second user 125, a user device 115 providing the user interface receives the selection from the first user 125, generates a request indicating that the first user 125 requests to comment on behalf of the second user 125 and sends the request to the authorization application 195. The authentication module 304 receives, via the second controller 302, the request from the user device 115. In some instances, an authorization request indicates that a first user 125 requests to publish a new post or message on behalf of the second user 125.

In some implementations, upon receiving an authorization request for a first user 125 commenting on a post on behalf of a second user 125, the authentication module 304 determines whether the post has been also shared with the second user 125. For example, a third user 125 has published the post and shared the post with a group of other users 125 including the first user 125. The authentication module 304 determines whether the group of other users 125 also includes the second user 125. If the authentication module 304 determines that the third user 125 has not shared the post with the second user 125, the authentication module 304 generates and sends a decline signal to one or more of the social network server 101, the third party server 107 and the user device 115 for not allowing the first user 125 to comment on the post on behalf of the second user 125. In some implementations, if the authentication module 304 determines that the third user 125 has also shared the post with the second user 125, the authentication module 304 determines whether the second user 125 has an access right to comment on the post. For example, the authentication module 304 determines whether the author of the post (e.g., the third user 125) allows the second user 125 to comment on the post.

In some implementations, if the authentication module 304 determines that the second user 125 has an access right to comment on the post, the authentication module 304 retrieves, via the second controller 302, account data describing account settings for the second user 125 from the storage 197 and determines whether the account settings allow the first user 125 an access right to comment on the post on the second user's 125 behalf. Otherwise, the authentication module 304 generates and sends a decline signal to one or more of the social network server 101, the third party server 107 and the user device 115 for not allowing the first user 125 to comment on the post on behalf of the second user 125. If the authentication module 304 determines that the account settings allow the first user 125 an access right to comment on the post on the second user's 125 behalf, the authentication module 304 generates and sends an authorization signal to one or more of the social network server 101, the third party server 107 and the user device 115 for allowing the first user 125 to comment on the post on behalf of the second user 125.

In some implementations, the authentication module 304 receives an authorization request for a first user 125 publishing a new post or message on behalf of a second user 125. The authentication module 304 retrieves, via the second controller 302, account data describing account settings for the second user 125 from the storage 197 and determines whether the account settings allow the first user 125 an access right to publish a new post or message on the second user's 125 behalf. If the authentication module 304 determines that the account settings allow the first user 125 an access right to publish a new post or message on the second user's 125 behalf, the authentication module 304 generates and sends an authorization signal to one or more of the social network server 101, the third party server 107 and the user device 115 for allowing the first user 125 to publish a new post or message on behalf of the second user 125. Otherwise, the authentication module 304 generates and sends a decline signal to one or more of the social network server 101, the third party server 107 and the user device 115 for not allowing the first user 125 to publish a new post or message on behalf of the second user 125.

The notification module 306 can be software including routines for generating notifications upon submission of user activities. In some implementations the notification module 306 can be a set of instructions executable by the second processor 335 to provide the functionality described below for generating notifications upon submission of user activities. In some instances, the notification module 306 can be stored in the second memory 337 of the computing device 300 and can be accessible and executable by the second processor 335. The notification module 306 may be adapted for cooperation and communication with the second processor 335 and other components of the computing device 300 via signal line 326.

In some implementations, the notification module 306 receives, via the second controller 302, a submission signal from one or more of the social network server 101, the third party server 107 and the user device 115 upon the first user 125 submitting a comment on an existing post or submitting a new post or message on behalf of the second user 125. The comment at this stage can be referred to as an "unapproved" comment since the second user 125 has not yet approved the comment submitted by the first user 125. Similarly, the new post or message at this stage may be referred to as an "unapproved" post or message. In some implementations, the "unapproved" comment can be visible to other users 125 if the second user 125 configures the account settings as making the "unapproved" comments visible without an approval by the second user 125. For example, the "unapproved" comment may be clearly marked as such, grayed out, or with italics font, etc. In some implementations, if the second user 125 configures the account settings as making the "unapproved" comments invisible without an approval by the second user 125, the "unapproved" comment may be invisible to other users 125 and only visible to the first user 125 and the second user 125. In some implementations, the second user 125 can configure the account settings similarly regarding the "unapproved" new post or message. For example, the second user 125 can configure the account settings as making the "unapproved" new post or message visible without an approval by the user 125. For example, the second user 125 may configure the account settings as making the "unapproved" new post or message invisible without an approval by the user 125.

In some implementations, the notification module 306 generates a notification for the second user 125 including the "unapproved" comment, or the "unapproved" new post or message submitted by the first user 125 upon receiving the submission signal. For example, the notification may invite the second user 125 to review the "unapproved" comment, or the "unapproved" new post or message. The notification module 306 sends the notification to one or more of the social network server 101, the third party server 107 and the user device 115 for displaying the notification to the second user 125 upon the second user 125 logging in the service.

In some implementations, the notification module 306 receives actions on the comment, or new post or message from the first user 125 during the "unapproved" stage. For example, the notification module 306 may receive an edit on the "unapproved" comment from the first user 125. For example, the notification module 306 may receive an indication that the first user 125 takes back the "unapproved" comment. In some implementations, upon receiving an edit on the "unapproved" comment, the notification module 306 generates and sends a new notification including the edit. The notification module 306 also updates a version index for the "unapproved" comment. For example, once the first user 125 edits on the "unapproved" comment, the notification module 306 increases the version index by one. The notification module 306 also stores and timely updates the version index and state of the comment in the storage 197. For example, the state of the comment may include an "unapproved" state and an "approved" state. By doing this, the notification module 306 avoids concurrent approval of an "unapproved" comment with a stale version index.

In some implementations, the notification module 306 may receive an edit on the "unapproved" new post or message from the first user 125. For example, the first user 125 may modify the new post or message. In some instances, the first user 125 may take the new post or message back. Similarly, the notification module 306 generates and sends a new notification including the action of the first user 125. The notification module 306 may also updates a version index for the modified new post or message and stores the updated version index and a state for the new post or message in the storage 197.

The second determination module 308 can be software including routines for determining whether a user 125 approves an action on behalf of the user 125. In some implementations, the second determination module 308 can be a set of instructions executable by the second processor 335 to provide the functionality described below for determining whether a user 125 approves an action on behalf of the user 125. In some instances, the second determination module 308 can be stored in the second memory 337 of the computing device 300 and can be accessible and executable by the second processor 335. The second determination module 308 may be adapted for cooperation and communication with the second processor 335 and other components of the computing device 300 via signal line 328.

In some implementations, the second determination module 308 receives, via the second controller 302, a user input describing a decision of the second user 125. For example, the second user 125 logs in and receives the notification including the "unapproved" comment submitted by the first user 125 on behalf of the second user 125. The second user 125 may review the "unapproved" comment and make a decision. For example, the second user 125 can approve, reject, edit or approve the comment. In some instances, the second user 125 can also report to the second determination module 308 the first user 125 making unwanted comments on the second user's 125 behalf as a spammer. In some instances, the second user 125 can also block the first user 125 from further commenting on existing posts, publishing new posts or messages, or from other communications. In some implementations, the second user 125 specifies the decision by a user input via a user interface. For example, a user input may indicate that the second user 125 has approved the comment submitted by the first user 125 on behalf of the second user 125. In some instances, a user input may indicate that second user 125 has rejected the comment submitted by the first user 125 on behalf of the second user 125.

In some implementations, the second user 125 receives a notification regarding an "unapproved" new post or message. Similarly, the second user 125 can approve, reject, edit or approve the new post or message. The second user 125 can also report to the second determination module 308 the first user 125 publishing unwanted posts or messages on the second user's 125 behalf as a spammer. In some implementations, the second user 125 may specify a decision regarding an "unapproved" post or message by a user input via a user interface. For example, a user input may indicate that second user 125 has approved the post or message submitted by the first user 125 on behalf of the second user 125.

If the second determination module 308 determines that the second user 125 has approved the comment, post or message submitted by the first user 125 on behalf of the second user 125 based at least in part on the user input, the second determination module 308 sends the approved comment, post or message to the metadata module 310 for generating metadata associated with the comment, post or message. Otherwise the second determination module 308 generates and sends a decline signal to one or more of the social network server 101, the third party server 107 and the user device 115 for not publishing the comment, post or message on behalf of the second user 125.

In some implementations, the second determination module 308 also sends the approved comment, post or message to the second user interface module 312 for posting the comment, post or message in a user interface. In some implementations, the second determination module 308 sends the approved comment, post or message to one or more of the social network server 101, the third party server 107 and the user device 115 for posting the comment, post or message in a corresponding service. For example, the second determination module 308 sends an approved comment to the social network server 101 for including the approved comment in the second user's 125 social feed with a social network service. In some implementations, the approved comment can be deleted from the social feed depending upon the consent of the first user 125 or the second user 125 and upon the consent of the social network service. In some implementations, the approved comment published by the first user 125 on behalf of the second user 125 may not be different to viewers from other comments published by the second user 125. In some implementations, the approved comment may be displayed so that viewers can tell it may be published by the first user 125 on behalf of the second user 125. For example, information describing that the approved comment may be originally made by the first user 125 can be made available along with the approved comment to viewers.

The metadata module 310 can be software including routines for generating metadata associated with approved activities. In some implementations, the metadata module 310 can be a set of instructions executable by the second processor 335 to provide the functionality described below for generating metadata associated with approved activities. In some instances, the metadata module 310 can be stored in the second memory 337 of the computing device 300 and can be accessible and executable by the second processor 335. The metadata module 310 may be adapted for cooperation and communication with the second processor 335 and other components of the computing device 300 via signal line 330.

In some implementations, the metadata module 310 receives approved activities and determines metadata associated with the approved activities. For example, the metadata module 310 receives an approved comment and determines metadata associated with the comment, e.g., the author of the comment, the user 125 on whose behalf the comment has been published, the version index, etc. Similarly, the metadata module 310 may receive an approved post or message and determines metadata associated with the post or message, e.g., the author of the post or message, the user 125 on whose behalf the post or message has been published, the version index, etc. The metadata module 310 stores the metadata associated with the activities in the storage 197 for future searching and legal purpose.

The second user interface module 312 can be software including routines for generating graphical data for providing a graphical user interface to the user device 115. In some implementations, the second user interface module 312 can be a set of instructions executable by the second processor 335 to generate graphical data for providing the user interfaces described below with reference to FIG. 8. The second user interface module 312 sends the graphical data to a user device 115, causing the user device 115 to present the graphical user interface to the user 125. For example, the graphical user interface displays a notification for the user 125 to review an "unapproved" comment. The user 125 provides inputs to the graphical user interface using the user device 115, thereby providing the inputs necessary for the second determination module 308 to perform its function, e.g., determines whether the user 125 has approved the comment. In some implementations, the second user interface module 312 can be a set of instructions executable by the second processor 335 to provide the functionality described above for generating graphical data for providing user interfaces. In some instances, the second user interface module 312 can be stored in the second memory 337 of the computing device 300 and can be accessible and executable by the second processor 335. The second user interface module 312 may be adapted for cooperation and communication with the second processor 335 and other components of the computing device 300 via signal line 332.

Figure 4:
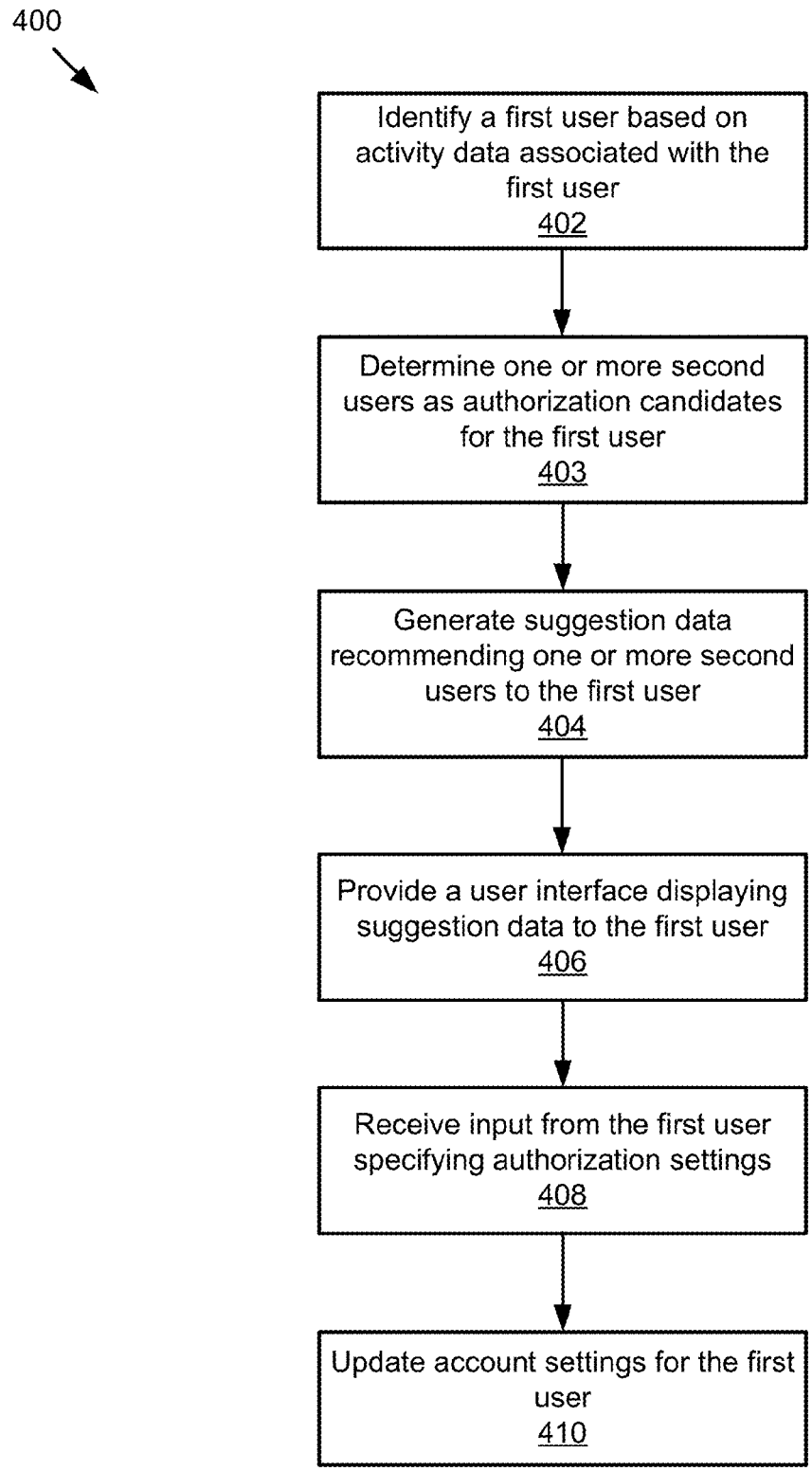
FIG. 4 is a flowchart of an example method for suggesting a first user to authorize access rights to one or more second users.

Referring now to FIG. 4, an example of a method 400 for suggesting a first user 125 to authorize access rights to one or more second users 125 is described. In the illustrated implementation, the method 400 can include identifying 402 a first user 125 based at least in part on activity data associated with the first user 125. For example, the identification module 204 parses activity data associated with a first user 125 and determines the first user 125 as a potential authorizer 125 that has a potential for authorizing other users 125 to act on behalf of the first user 125. For example, by parsing one or more browser cookies, the identification module 204 determines that the first user 125 shares a computer with a second user 125 and the first user 125 may have a desire to authorize the second user 125 to act (e.g., comment on posts, publish new posts, etc.) on behalf of the first user 125. The method 400 can include determining 403 one or more second users 125 as authorization candidates for the first user 125. The method 400 can also include generating 404 suggestion data recommending the one or more second users 125 as authorization candidates to the first user 125. For example, the identification module 204 determines one or more second users 125 and generates suggestion data for recommending the first user 125 to allow the one or more second users 125 to act on behalf of the first user 125. The method 400 can include providing 406 a user interface displaying the suggestion data to the first user 125. For example, the first user interface module 206 generates graphical data and sends the graphical data to the user device 115, causing the user device 115 to provide a user interface displaying the suggestion data to the first user 125 upon the first user 125 logging in a service. The method 400 can also include receiving 408 an input from the first user 125 specifying authorization settings. For example, the first user 125 clicks an "authorize" button on the user interface via the user device 115, causing the first determination module 208 to receive an input indicating that the first user 125 has agreed to authorize the one or more second users 125 an access right to act on behalf of the first user 125. The method 400 can include updating 410 account settings for the first user 125. For example, the first determination module 208 determines that the first user 125 has agreed to authorize the one or more second users 125 an access right to act on behalf of the first user 125 and sends the determination to the update module 210 that updates account settings for the first user 125 based at least in part on the authorization specified by the first user 125.

Figure 5A:
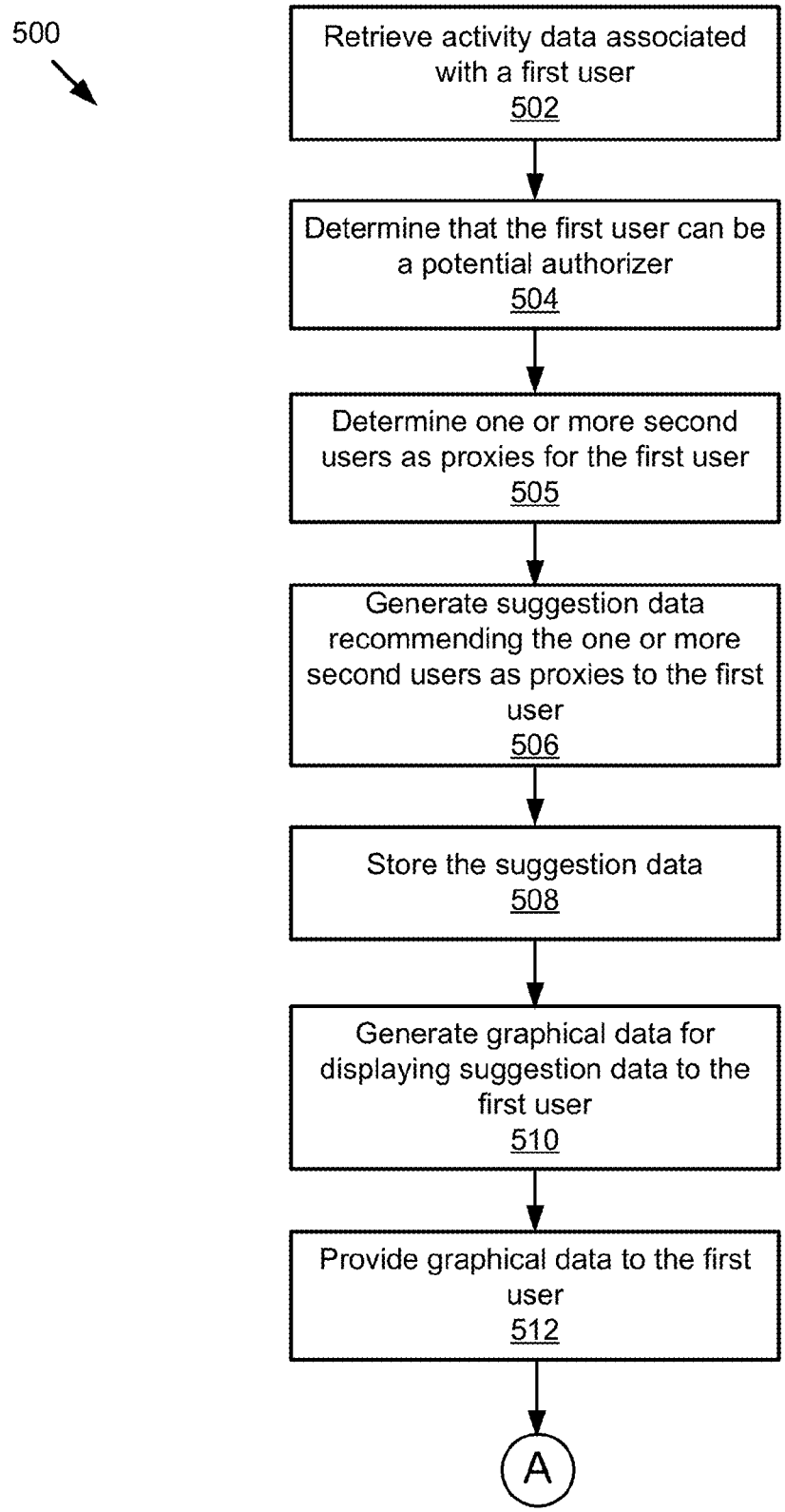
FIGS. 5A-5B are flowcharts of an example method for suggesting a first user to authorize access rights to one or more second users.
Figure 5B:
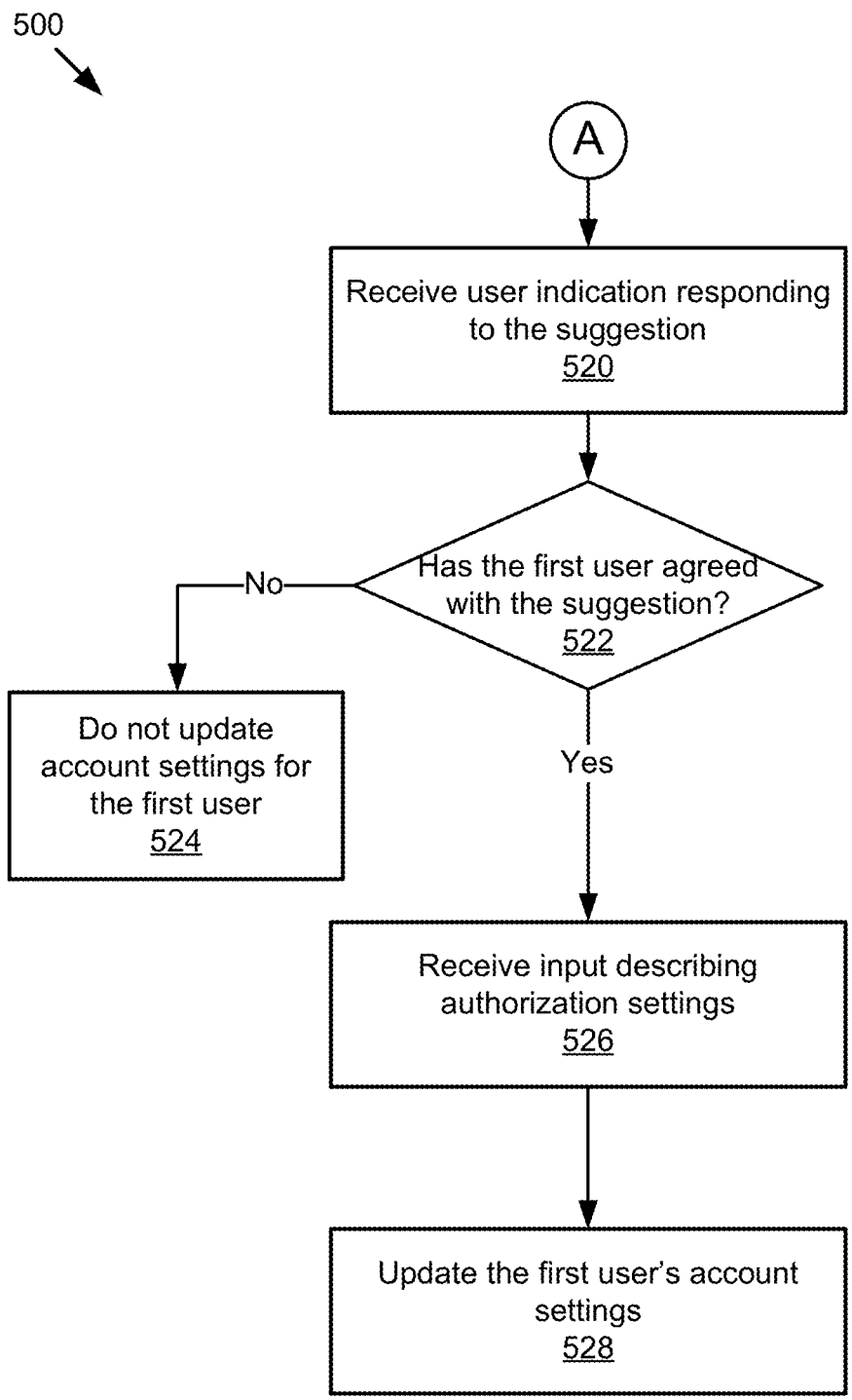

Referring now to FIGS. 5A-5B, another example of a method 500 for suggesting a first user 125 to authorize access rights to one or more second users 125 is described. Turning to FIG. 5A, the method 500 can include retrieving 502 activity data associated with a first user 125. For example, the first controller 202 retrieves activity data including session data and interaction data associated with a first user 125 from one or more of the social network server 101, the third party server 107 and the user device 115. For example, the session data can include one or more browser cookies. The interaction data can describe one or more user interactions associated with the first user 125. The method 500 can also include determining 504 that the first user 125 may be a potential authorizer 125 who has a potential for authorizing other users 125 to act on behalf of the first user 125. For example, the identification module 204 parses one or more browser cookies associated with the first user 125 and determines that the first user 125 shares a computer with another user 125 so that the first user 125 may have a desire to authorize the other user 125 an access right to act on behalf of the first user 125. The method 500 can include determining 505 one or more second users 125 as proxies for the first user 125. For example, the identification module 204 determines one or more second users 125 as proxies for the first user 125 based on the activity data associated with the first user 125. For example, the activity data indicates that the one or more second users 125 may be users 125 sharing computer devices with the first user 125. The method 500 can include generating 506 suggestion data recommending the one or more second users 125 as proxies to the first user 125. For example, the identification module 204 generates suggestion data describing the one or more second users 125 to be recommended to the first user 125 to give authorization to. The method 500 can also include storing 508 the suggestion data in the storage 197. The method 500 can include generating 510 graphical data for displaying one or more suggestions to the first user 125 and providing 512 the graphical data to the first user 125. For example, the first user interface module 206 generates graphical data and sends the graphical data to the user device 115, causing the user device 115 to provide a user interface displaying the suggestion data to the first user 125 upon the first user 125 logging in a service.

Referring now to FIG. 5B, the method 500 can include receiving 520 a user indication responding to the one or more suggestions. For example, the first user 125 responds to the one or more suggestions in the user interface via the user device 115, causing the first determination module 208 to receive, via the first controller 202, a user indication describing the response of the first user 125. The method 500 can also include determining 522 whether the first user 125 has agreed with the one or more suggestions based at least in part on the user indication. If the first determination module 208 determines that the first user 125 has not agreed with the one or more suggestions, the method 500 may continue by not updating 524 account settings for the first user 125. Otherwise, the method 500 may continue by receiving 526 a user input specifying the authorization settings for the first user 125. For example, the first user 125 further specifies authorization settings (e.g., allowing the one or more second users 125 to comment on existing posts but not to publish new posts on behalf of the first user 125, etc.) via a user interface, causing the update module 210 to receive, via the first controller 202, a user input specifying the authorization settings for the first user 125. The method 500 can also including updating 528 the first user's 125 account settings. For example, the update module 210 configures the account settings for the first user 125 based at least in part on the authorization settings specified by the user input.

Figure 6A:
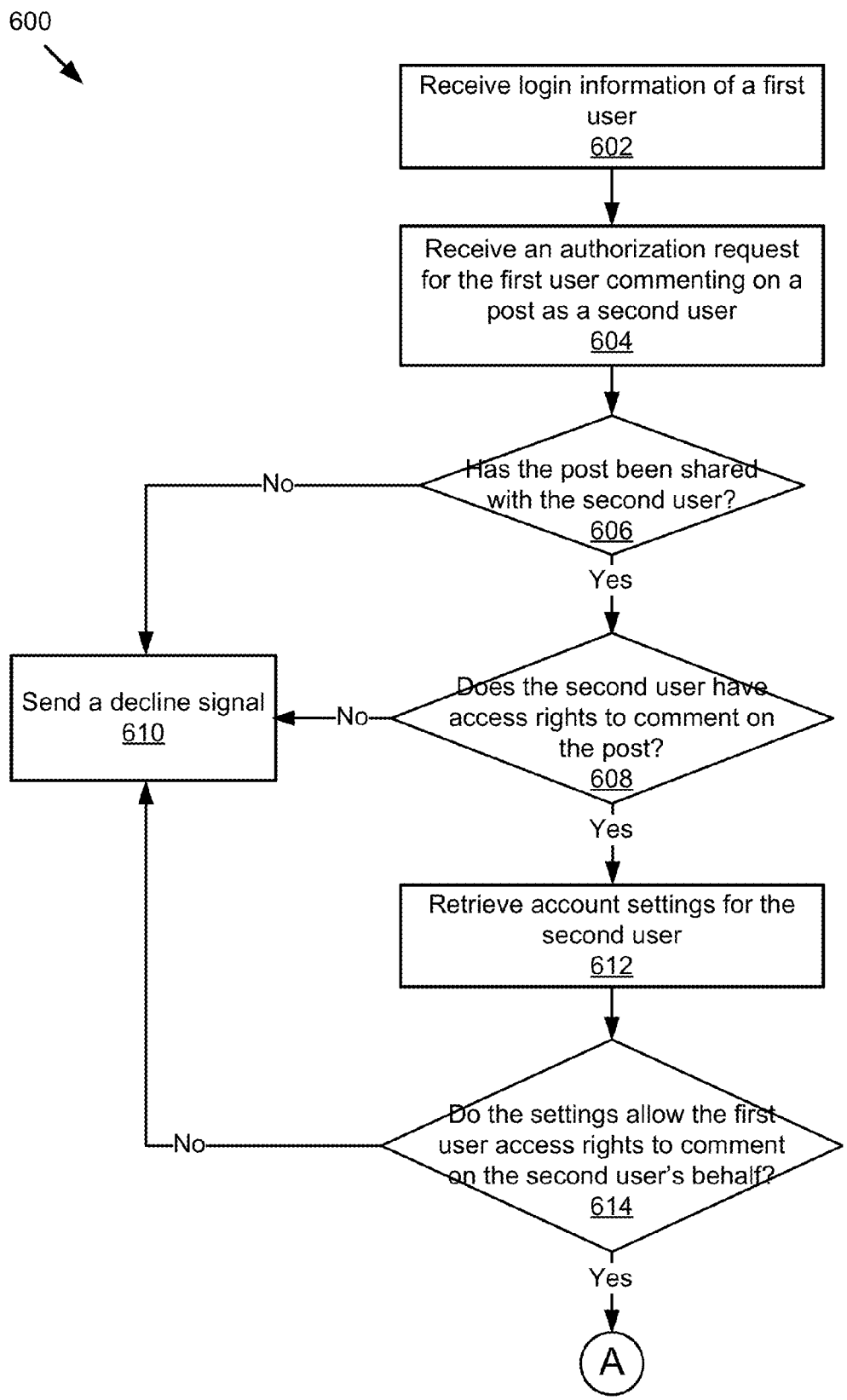
FIGS. 6A-6C are flowcharts of an example method for authorizing a first user to comment on behalf of a second user.
Figure 6B:
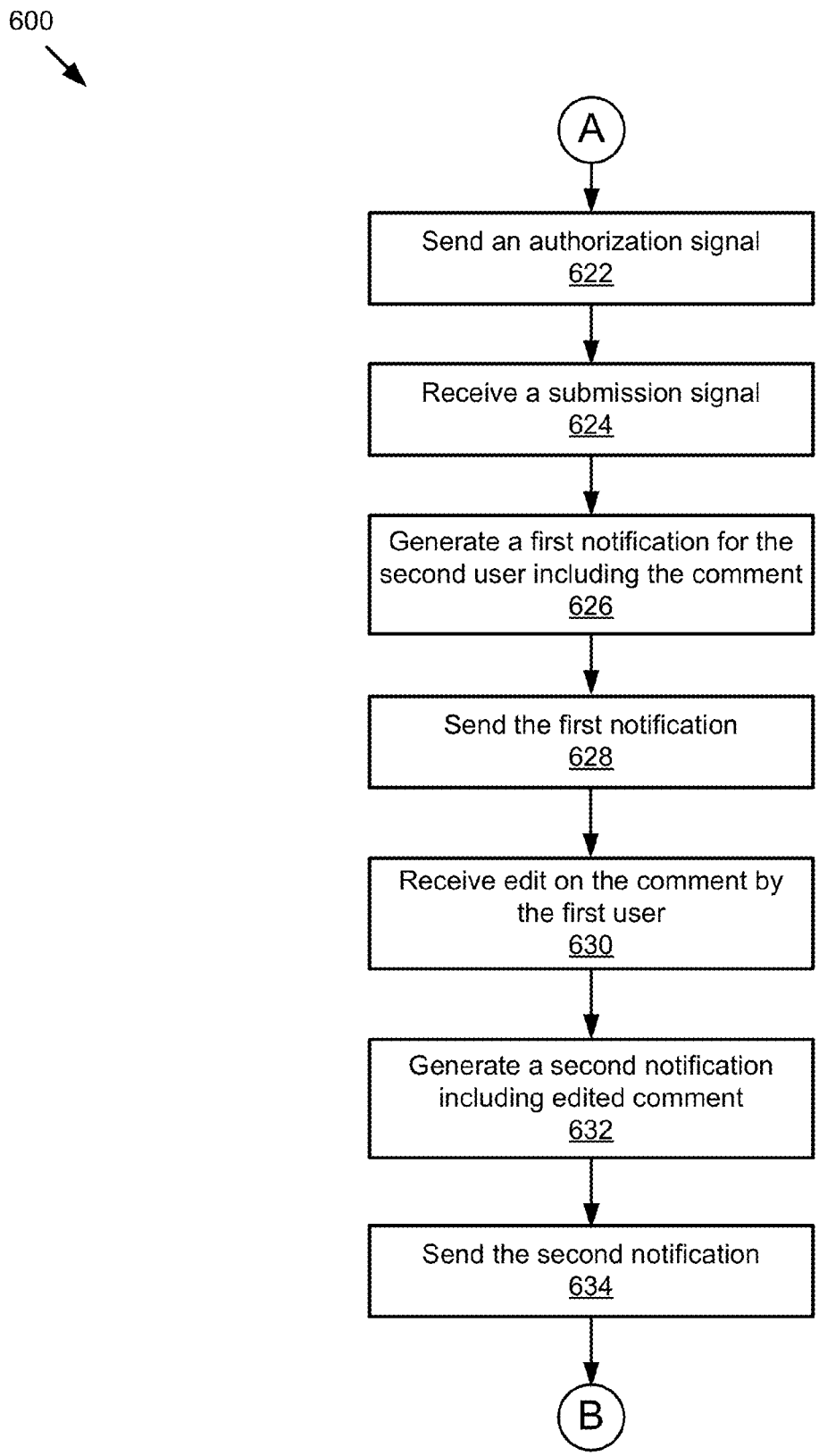
Figure 6C:
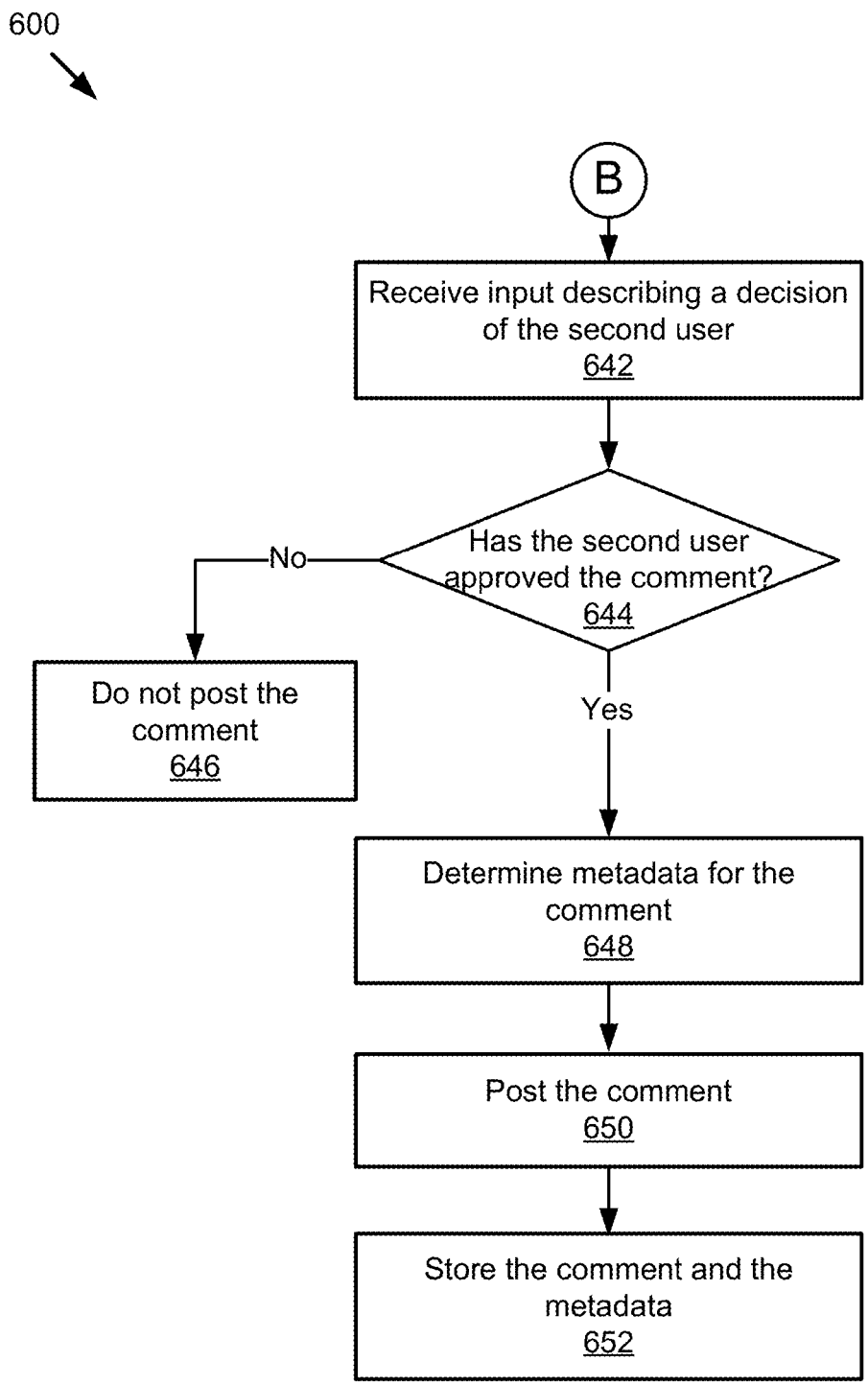

Referring now to FIGS. 6A-6C, an example of a method 600 for authorizing a first user 125 to comment on behalf of a second user 125 is described. Turning to FIG. 6A, the method 600 can include receiving 602 login information of a first user 125. For example, a first user 125 logs in a social network service provided by the social network application 103, causing the social network application 103 receiving login information for the first user 125. The method 600 can also include receiving 604 an authorization request for the first user 125 commenting on a post as a second user 125. For example, the first user 125 selects an option of commenting on a post as a second user 125 via a user interface, causing the authentication module 304 receives, via the second controller 302, an authorization request for the first user 125 commenting on a post as the second user 125. The method 600 can include determining 606 whether the post has been shared with the second user 125 as well. If the post has been shared with the second user 125, the method 600 may continue by determining 608 whether the second user 125 has an access right to comment on the post. Otherwise, the method 600 may continue by generating and sending 610 a decline signal to one or more of the social network server 101 and the user device 115.

If it can be determined 608 that the second user 125 has an access right to comment on the post, the method 600 may continue by retrieving 612 account data describing account settings for the second user 125. If it can be determined 608 that the second user 125 does not have an access right to comment on the post, the method 600 may continue by generating and sending 610 a decline signal to one or more of the social network server 101 and the user device 115. The method 600 also includes determining 614 whether the account settings allow the first user 125 an access right to comment on the second user's 125 behalf. If the account settings for the second user 125 do not allow the first user 125 to comment on the second user's behalf, the method 600 may continue by generating and sending 610 a decline signal to one of the social network server 101 and the user device 115.

Referring to FIG. 6B, if the account settings for the second user 125 allow the first user 125 to comment on the second user's behalf, the method 600 may continue by sending 622 an authorization signal to one or more of the social network server 101 and the user device 115 for allowing the first user 125 to comment on the post on behalf of the second user 125. The method 600 can include receiving 624 a submission signal from one or more of the social network server 101 and the user device 115 indicating that the first user 125 has submitted the comment. The method 600 can also include generating 626 a first notification for the second user 125 including the comment and sending 628 the first notification to one or more of the social network server 101 and the user device 115 for displaying the first notification to the second user 125 upon the second user 125 logging in a social network service. The method 600 may also include receiving 630 an edit on the comment by the first user 125. For example, the first user 125 edits on the comment via the user interface, causing the notification module 306 receives, via the second controller 302, the edit on the comment by the first user 125. The method 600 may continue by generating 632 a second notification including the edited comment and sending 634 the second notification to one or more of the social network server 101 and the user device 115. In some implementations, receiving 630 an edit on the comment by the first user 125, generating 632 a new notification and sending 634 the new notification may not be included in the method 600 if the first user 125 does not edit on the submitted comment. In some implementations, receiving 630 an edit on the comment by the first user 125, generating 632 a new notification and sending 634 the new notification may be repeated for multiple times depending upon the first user 125 editing the comment for multiple times.

Referring to FIG. 6C, the method 600 can include receiving 642 an input describing a decision of the second user 125. For example, the input specifies whether the second user 125 has approved the comment or not. The method 600 can also include determining 644 whether the second user 125 has approved the comment based at least in part on the input received at step 642. If the second user 125 has not approved the comment, the method 600 may continue by not posting 646 the comment. Otherwise, the method 600 may continue by determining 648 metadata for the comment. For example, the metadata for the comment includes data describing the author of the comment (e.g., the first user 125), the user 125 on whose behalf the comment has been published (e.g., the second user 125), etc. The method 600 may continue by posting 650 the comment. For example, the second user interface module 312 generates graphical data and sends the graphical data to the user device 115, causing the user device 115 to include the comment in the second user's 125 social feed displayed in a user interface. The method 600 can also include storing 652 the comment and the metadata associated with the comment in the storage 197.

Figure 7:
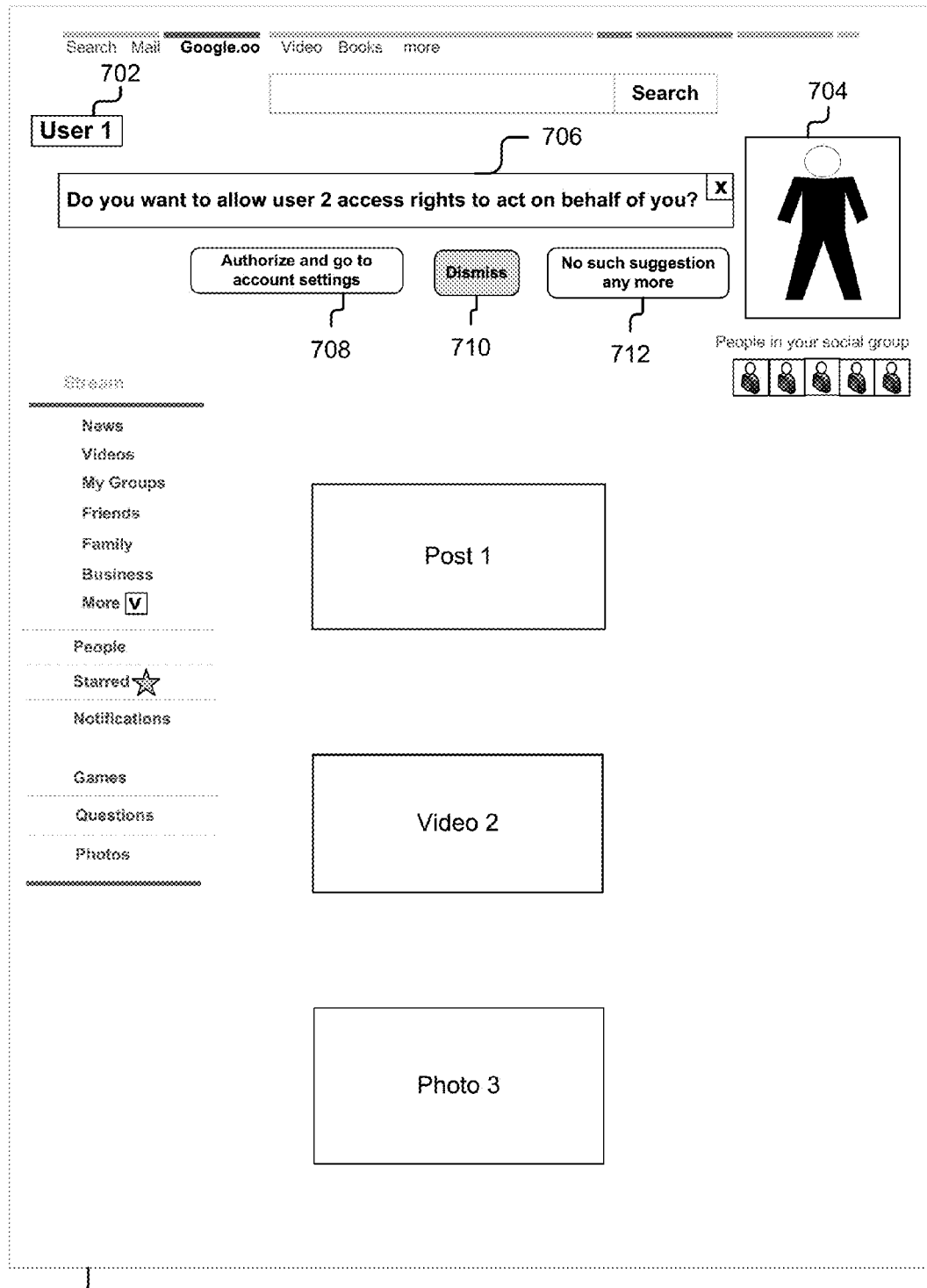
FIG. 7 is a graphic representation of an example user interface of a social network portal displaying an authorization suggestion for a user.

FIG. 7 is a graphic representation of an example user interface 700 of a social network portal displaying an authorization suggestion for a first user 125 upon the first user 125 logging in a social network service provided by the social network application 103. The social network portal 700 includes a graphical representation of a user name 702 (e.g., "User 1") for a first user 125 logging in the social network service and a user icon 704. The user icon 704 may display a profile photo of the first user 125. The social network portal 700 includes a graphical representation of an authorization suggestion 706. For example, the suggestion 706 recommending the first user 125 to allow a second user 125 (e.g., "User 2") access rights to act on behalf of the first user 125 (e.g., "User 1"). The social network portal 700 also includes multiple response buttons 708, 710, 712 that may be clickable for the first user 125 to respond to the suggestion 706. For example, the button 708 indicates that the first user 125 can click it to authorize the second user 125 and link to a new web page for configuring account settings for the first user 125. The button 710 may be clickable for the first user 125 to dismiss the suggestion 706. The button 712 may be clickable for the first user 125 to opt out from receiving such a suggestion 706.

Figure 8:
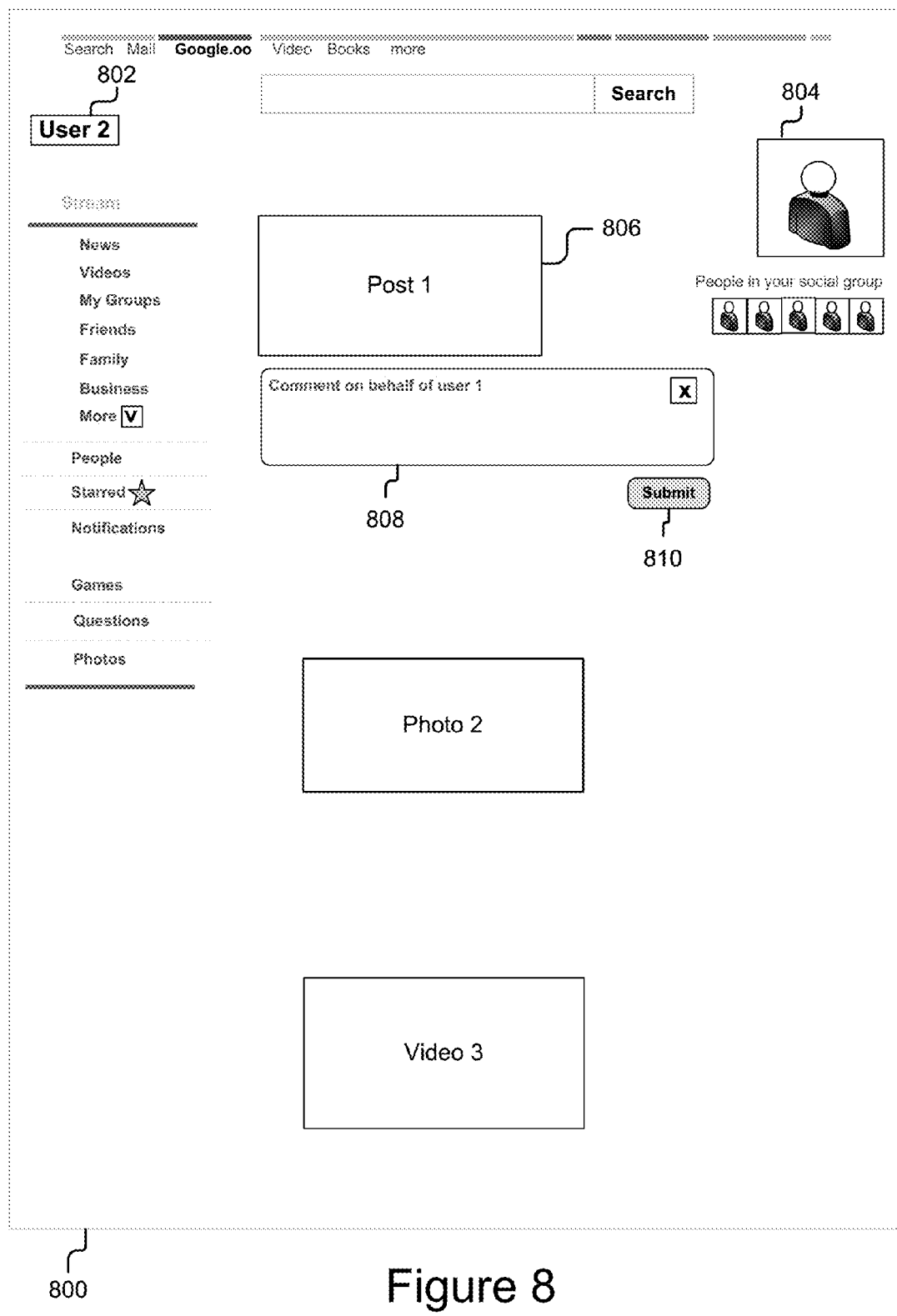
FIG. 8 is a graphic representation of an example user interface of a social network portal displaying an access for a first user to comment on a post on behalf of a second user.

FIG. 8 is a graphic representation of an example user interface 800 of a social network portal displaying an access for a first user 125 to comment on a post on behalf of a second user 125. The social network portal 800 can include a graphical representation for a user name 802 of a first user 125 (e.g., "User 2") and a user icon 804 displaying a profile photo for the first user 125. For example, the first user 125 has been authorized by a second user 125 an access right to comment on existing posts on behalf of the second user 125. The social network portal 800 can also include a post 806 published by a third user 125 to share with the first user 125 and the second user 125. The social network portal 800 can include a text edit box 808 for the first user 125 to write a comment on the post 806 on behalf of the second user 125. The social network portal 800 can also include a "submit" button 810 clickable for the first user 125 to submit the comment.

Figure 9:
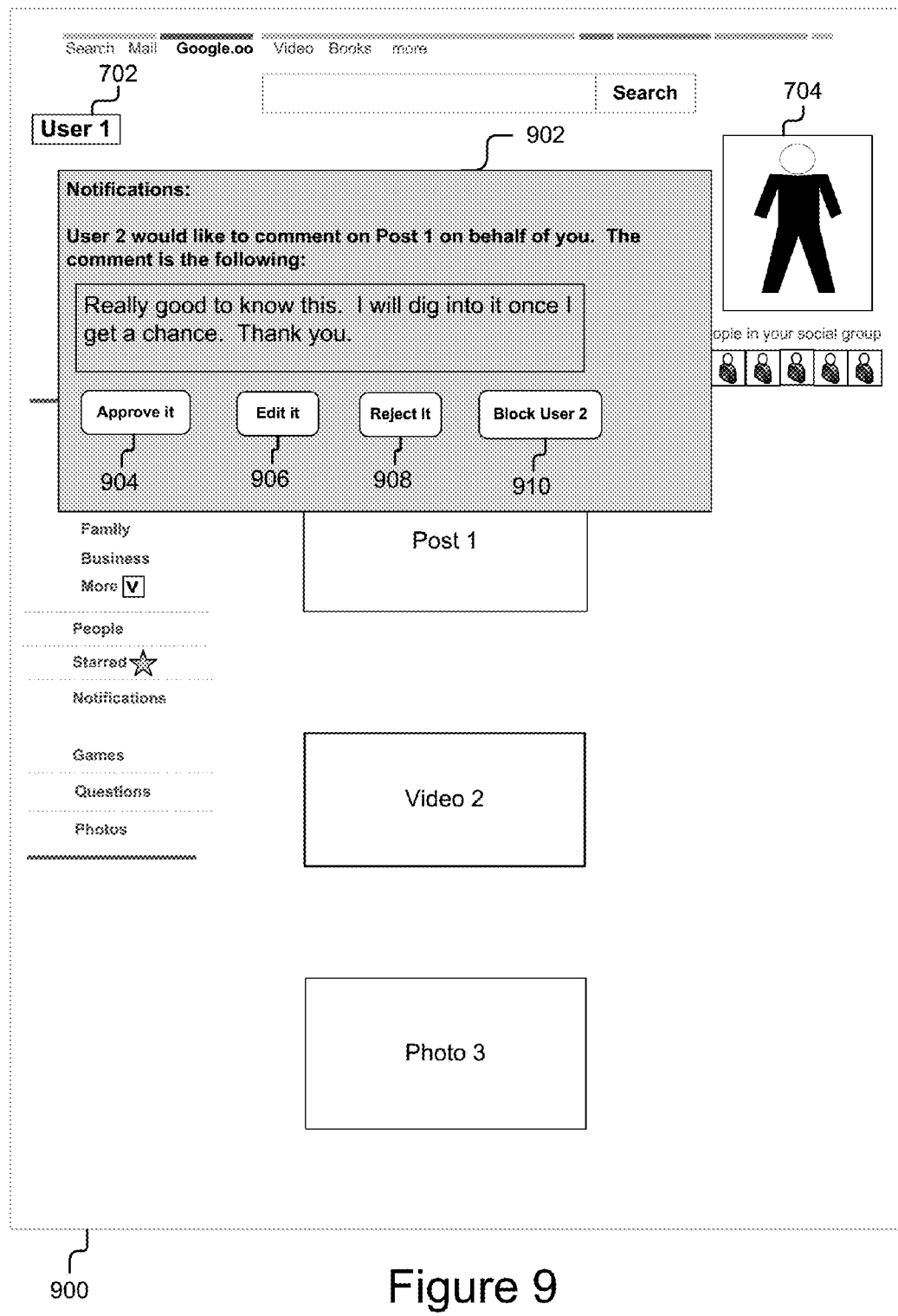
FIG. 9 is a graphic representation of an example user interface of a social network portal displaying a notification for a first user to review a comment submitted by a second user on behalf of the first user.

FIG. 9 is a graphic representation of an example user interface 900 of a social network portal displaying a notification for a first user 125 to review a comment submitted by a second user 125 on behalf of the first user 125. The social network portal 900 includes the graphical representation of the user name 702 and the user icon 704 as described by FIG. 7. The social network portal 900 includes a graphical representation of a notification 902 for the first user 125 represented by the user name 702. In the illustrated implementations, the notification 902 may indicate that a second user 125 would like to comment on a post on behalf of the first user 125. The notification 902 can also display the comment submitted by the second user 125 for the first user 125 to review. The notification 902 can include buttons 904, 906, 908, 910 that may be clickable for the first user 125 to respond to the comment. For example, the button 904 indicates that the first user 125 can click it to approve the comment submitted by the second user 125 on behalf of the first user 125 so that the comment can be published in the social network as the first user's 125 comment. The button 906 may be clickable for the first user 125 to edit the comment before publishing it. The button 908 may be clickable for the first user 125 to reject the comment submitted by the second user 125 on behalf of the first user 125 so that the comment cannot be published in the social network. The button 910 may be clickable for the first user 125 to block the second user 125 who has tried to submit the comment on behalf of the first user 125.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   determining a first user based at least in part on one or more user interactions associated with the first user, the first user having a potential for authorizing other users to act on behalf of the first user;
   determining one or more second users as authorization candidates for the first user based on the one or more user interactions associated with the first user;
   generating suggestion data recommending the first user to authorize the one or more second users an access right to act on the behalf of the first user;
   providing the suggestion data to the first user; and
   responsive to the first user authorizing the one or more second users the access right to act on the behalf of the first user, updating an account setting for the first user describing the authorization of the access right to the one or more second users.

2. The method of claim 1, wherein the first user and the one or more second users share one or more electronic devices including a computer and a phone.

3. The method of claim 1, wherein the suggestion data recommends the first user to authorize the one or more second users the access right to comment on a post on the behalf of the first user.

4. The method of claim 1, further comprising:
   receiving a request for a third user commenting on a post on behalf of the first user;
   determining whether the post has been shared with the first user;
   responsive to the determination that the post has been shared with the first user, determining whether the first user has an access right to comment on the post;
   responsive to the determination that the first user has the access right to comment on the post, determining whether the third user has an access right to comment on behalf of the first user based at least in part on the account setting for the first user; and
   responsive to the determination that the third user has the access right to comment on behalf of the first user, sending an authorization signal.

5. The method of claim 4, further comprising:
   receiving a submission signal indicating that the third user has submitted a comment responding to the post;
   generating a first notification for the first user including the comment; and
   sending the first notification to the first user.

6. The method of claim 5, further comprising:
   receiving an edit on the comment from the third user;
   updating a version index for the edited comment;
   generating a second notification for the first user including the edited comment; and
   sending the second notification to the first user.

7. The method of claim 5, further comprising:
   receiving an indication from the first user that the first user has approved the comment; and
   determining graphical data for displaying the comment responding to the post.

8. A computer program product comprising a non-transitory computer usable medium including a computer readable program, wherein the computer readable program when executed on a computer causes the computer to:
   determine a first user based at least in part on one or more user interactions associated with the first user, the first user having a potential for authorizing other users to act on behalf of the first user;
   determine one or more second users as authorization candidates for the first user based on the one or more user interactions associated with the first user;
   generate suggestion data recommending the first user to authorize the one or more second users an access right to act on the behalf of the first user;
   provide the suggestion data to the first user; and
   responsive to the first user authorizing the one or more second users the access right to act on the behalf of the first user, update an account setting for the first user describing the authorization of the access right to the one or more second users.

9. The computer program product of claim 8, wherein the first user and the one or more second users share one or more electronic devices including a computer and a phone.

10. The computer program product of claim 8, wherein the suggestion data recommends the first user to authorize the one or more second users the access right to comment on a post on the behalf of the first user.

11. The computer program product of claim 8, wherein the computer readable program when executed on the computer causes the computer to also:
   receive a request for a third user commenting on a post on behalf of the first user;
   determine whether the post has been shared with the first user;
   responsive to the determination that the post has been shared with the first user, determine whether the first user has an access right to comment on the post;
   responsive to the determination that the first user has the access right to comment on the post, determine whether the third user has an access right to comment on behalf of the first user based at least in part on the account setting for the first user; and
   responsive to the determination that the third user has the access right to comment on behalf of the first user, send an authorization signal.

12. The computer program product of claim 11, wherein the computer readable program when executed on the computer causes the computer to also:
- receive a submission signal indicating that the third user has submitted a comment responding to the post;
- generate a first notification for the first user including the comment; and
- send the first notification to the first user.

13. The computer program product of claim 12, wherein the computer readable program when executed on the computer causes the computer to also:
- receive an edit on the comment from the third user;
- update a version index for the edited comment;
- generate a second notification for the first user including the edited comment; and
- send the second notification to the first user.

14. The computer program product of claim 12, wherein the computer readable program when executed on the computer causes the computer to also:
- receive an indication from the first user that the first user has approved the comment; and
- determine graphical data for displaying the comment responding to the post.

15. A system comprising:
- a processor; and
- a memory storing instructions that, when executed, cause the system to:
  - determine a first user based at least in part on describing one or more user interactions associated with the first user, the first user having a potential for authorizing other users to act on behalf of the first user;
  - determine one or more second users as authorization candidates for the first user based on the one or more user interactions associated with the first user;
  - generate suggestion data recommending the first user to authorize the one or more second users an access right to act on the behalf of the first user;
  - provide the suggestion data to the first user; and
  - responsive to the first user authorizing the one or more second users the access right to act on the behalf of the first user, update an account setting for the first user describing the authorization of the access right to the one or more second users.

16. The system of claim 15, wherein the first user and the one or more second users share one or more electronic devices including a computer and a phone.

17. The system of claim 15, wherein the suggestion data recommends the first user to authorize the one or more second users the access right to comment on a post on the behalf of the first user.

18. The system of claim 15, wherein the instructions that, when executed, cause the system to also:
- receive a request for a third user commenting on a post on behalf of the first user;
- determine whether the post has been shared with the first user;
- responsive to the determination that the post has been shared with the first user, determine whether the first user has an access right to comment on the post;
- responsive to the determination that the first user has the access right to comment on the post, determine whether the third user has an access right to comment on behalf of the first user based at least in part on the account setting for the first user; and
- responsive to the determination that the third user has the access right to comment on behalf of the first user, send an authorization signal.

19. The system of claim 18, wherein the instructions that, when executed, cause the system to also:
- receive a submission signal indicating that the third user has submitted a comment responding to the post;
- generate a first notification for the first user including the comment; and
- send the first notification to the first user.

20. The system of claim 19, wherein the instructions that, when executed, cause the system to also:
- receive an indication from the first user that the first user has approved the comment; and
- determine graphical data for displaying the comment responding to the post.

* * * * *